(12) United States Patent
Hsu

(10) Patent No.: US 12,223,138 B1
(45) Date of Patent: Feb. 11, 2025

(54) DRIVING SYSTEM HAVING MULTIPLE DRIVER CIRCUITS FOR COOPERATIVELY DRIVING DISPLAY PANEL AND DRIVER CIRCUIT THEREOF

(71) Applicant: NOVATEK Microelectronics Corp., Hsin-Chu (TW)

(72) Inventor: Chung-Yu Hsu, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/225,156

(22) Filed: Jul. 23, 2023

(51) Int. Cl.
   *G06F 3/041*  (2006.01)
   *G06F 3/14*   (2006.01)

(52) U.S. Cl.
   CPC ............ *G06F 3/04166* (2019.05); *G06F 3/14* (2013.01)

(58) Field of Classification Search
   CPC .................................................. G06F 3/04166
   See application file for complete search history.

(56) References Cited

U.S. PATENT DOCUMENTS

| | | | | |
|---|---|---|---|---|
| 5,175,731 A * | 12/1992 | Suarez | ..................... | G09G 5/14 370/462 |
| 5,230,041 A * | 7/1993 | Dinwiddie, Jr. | ......... | G09G 5/00 715/781 |
| 5,245,322 A * | 9/1993 | Dinwiddie, Jr. | .......... | G06F 3/14 348/E5.022 |
| 5,434,590 A * | 7/1995 | Dinwiddie, Jr. | .... | H04N 21/4143 348/E5.051 |
| 5,434,592 A * | 7/1995 | Dinwiddie, Jr. | .......... | G06F 3/14 715/255 |
| 5,526,017 A * | 6/1996 | Wilkie | ...................... | G06F 3/14 348/584 |
| 2004/0255339 A1* | 12/2004 | Agnoli | ............. | H04N 21/43632 375/E7.025 |
| 2014/0081826 A1* | 3/2014 | Acuna-Rohter | ....... | G06Q 40/06 705/37 |
| 2015/0091826 A1* | 4/2015 | Oh | ........................ | G09G 3/2096 345/173 |
| 2015/0123963 A1* | 5/2015 | Tsai | ..................... | G09G 3/2096 345/213 |
| 2018/0019863 A1* | 1/2018 | Liao | .......................... | H04L 7/04 |
| 2022/0179507 A1* | 6/2022 | Bakken | .................. | G06F 3/044 |
| 2023/0134476 A1* | 5/2023 | Jung | ..................... | G09G 3/3696 345/173 |

(Continued)

*Primary Examiner* — Chun-Nan Lin
(74) *Attorney, Agent, or Firm* — Winston Hsu

(57) ABSTRACT

A driving system includes a plurality of driver circuits each having a first terminal and a second terminal. The first terminal of each of the driver circuits is commonly coupled to a first transmission bus, and the second terminal of each of the driver circuits is commonly coupled to a second transmission bus. The driver circuits include a first driver circuit and a second driver circuit. The first driver circuit outputs a first synchronization signal to the first transmission bus through the first terminal. The second driver circuit outputs a second synchronization signal to the second transmission bus through the second terminal at the time when receiving the first synchronization signal from the first transmission bus. Wherein, a compensation time corresponding to the second driver circuit is calculated according to an output time point of the first synchronization signal and a reception time point of the second synchronization signal.

9 Claims, 25 Drawing Sheets

(56) References Cited

U.S. PATENT DOCUMENTS

| | | | |
|---|---|---|---|
| 2023/0289009 A1* | 9/2023 | Lim | G06F 3/0412 |
| 2024/0143104 A1* | 5/2024 | So | G06F 1/1652 |
| 2024/0211070 A1* | 6/2024 | Jung | G06F 3/04166 |

* cited by examiner

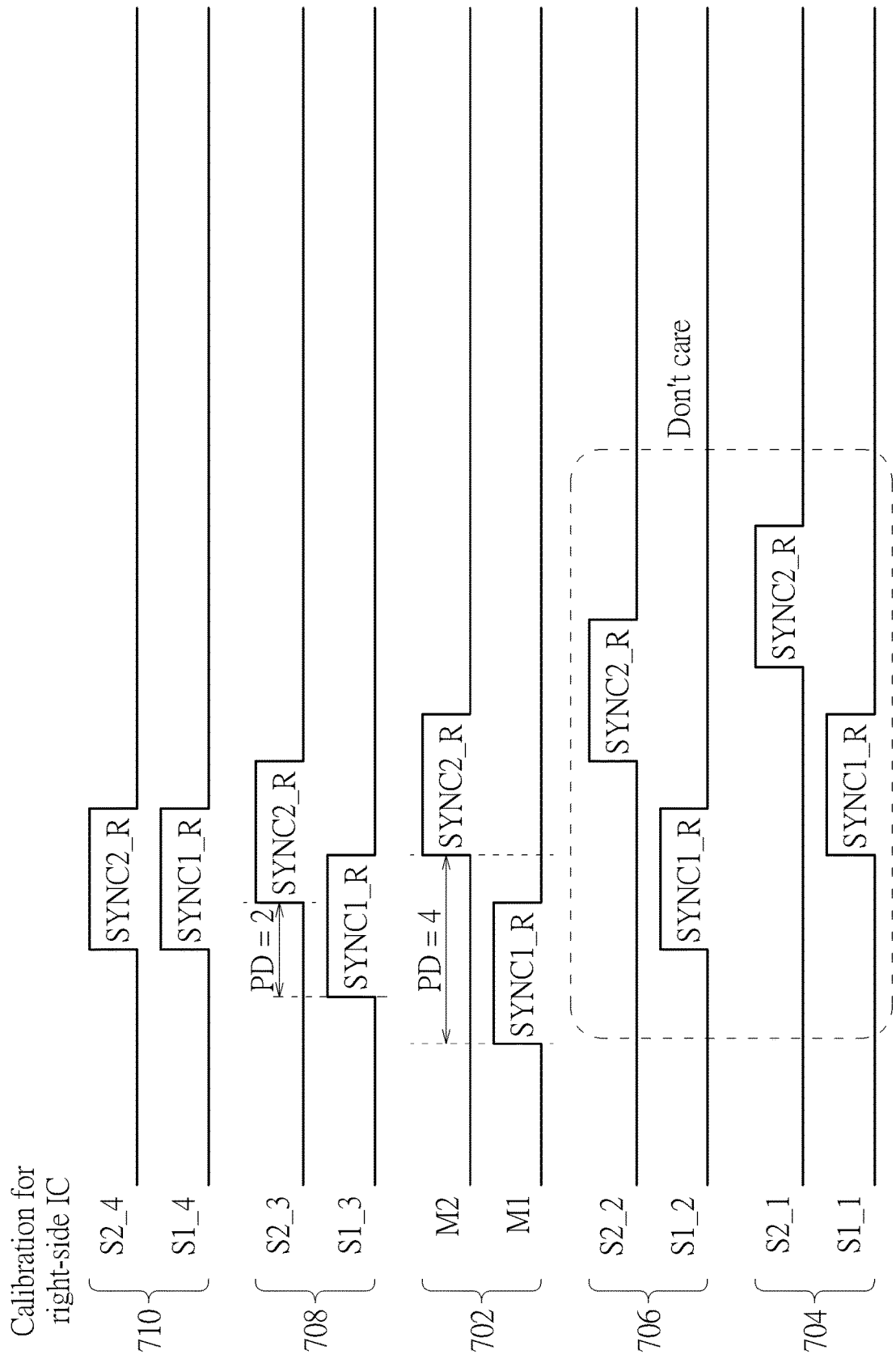

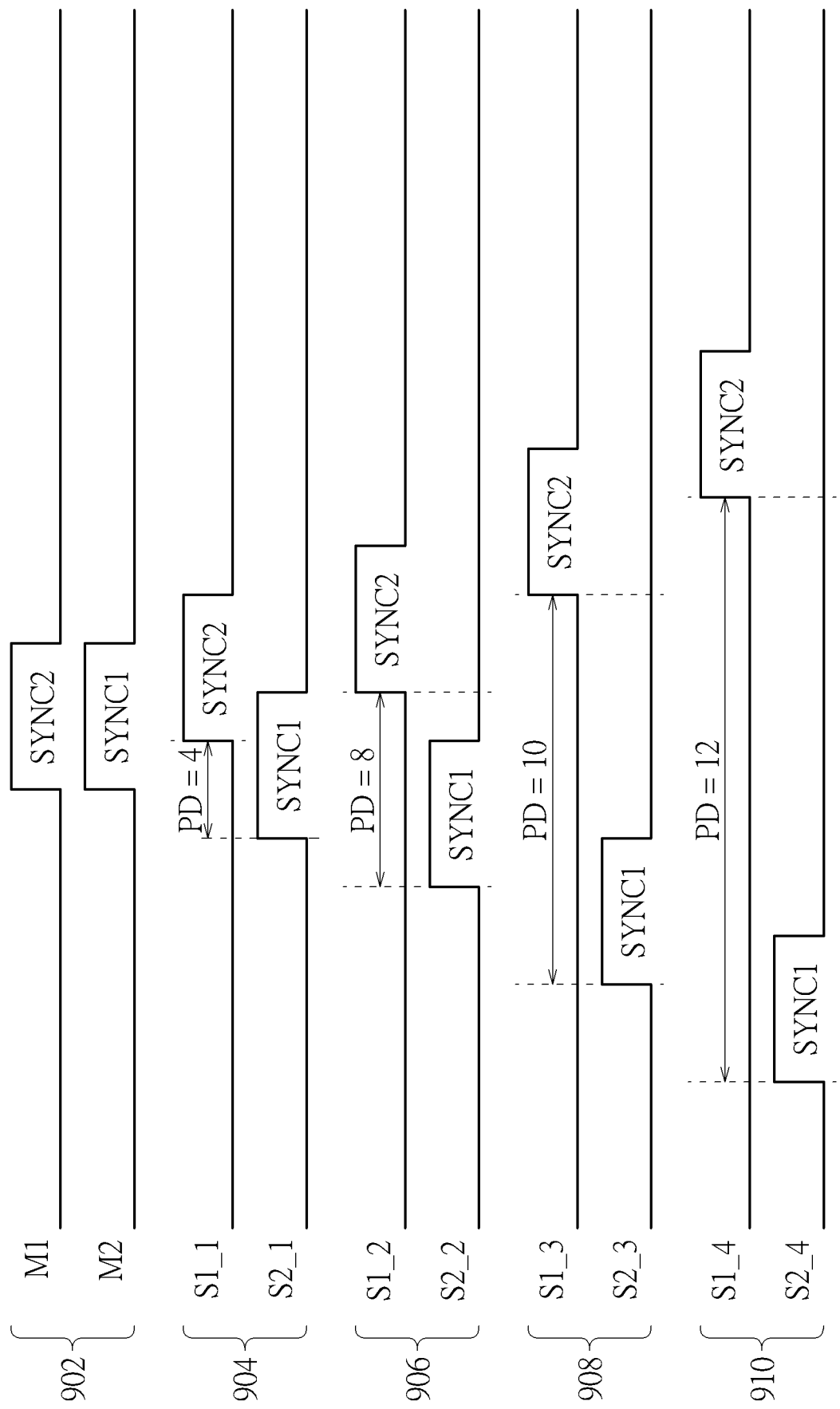

DRIVING SYSTEM HAVING MULTIPLE DRIVER CIRCUITS FOR COOPERATIVELY DRIVING DISPLAY PANEL AND DRIVER CIRCUIT THEREOF

BACKGROUND OF THE INVENTION

1. Field of the Invention

The present invention relates to a driving system and driver circuits, and more particularly, to a driving system having multiple driver circuits for cooperatively driving a display panel.

2. Description of the Prior Art

In various electronic products such as mobile phones, GPS navigator systems, monitors, laptops and computers, a touch panel is widely utilized as the interface for data communications. The touch panel is a human-based input device, which complies with requirements for hierarchy menu, and possesses keyboard and mouse functions and human-based operations such as handwriting input as well. Particularly, the touch panel is capable of integrating input and output functions in the same interface, e.g. the screen. This feature is far superior to the conventional input devices.

Due to the trends of increasing size and resolution, a touch panel may be commonly driven by multiple driver circuits (e.g., driver integrated circuits (ICs)). Each driver circuit is responsible to control the touch sensing and display operations of a corresponding area on the touch panel. In the touch sensing operations, a driver circuit outputs a touch driving signal to the corresponding area, where the touch driving signal is usually a sine wave signal. If the touch driving signals of two driver circuits are not synchronized, the received sensing signals may not be well demodulated.

SUMMARY OF THE INVENTION

It is therefore an objective of the present invention to provide a driving system and driver circuits for controlling a touch panel, where the driver circuits may perform touch sensing with a synchronous timing.

An embodiment of the present invention discloses a driving system, which comprises a plurality of driver circuits each having a first terminal and a second terminal. The first terminal of each of the plurality of driver circuits is commonly coupled to a first transmission bus, and the second terminal of each of the plurality of driver circuits is commonly coupled to a second transmission bus. The plurality of driver circuits comprise a first driver circuit and a second driver circuit. The first driver circuit outputs a first synchronization signal to the first transmission bus through the first terminal. The second driver circuit outputs a second synchronization signal to the second transmission bus through the second terminal at the time when receiving the first synchronization signal from the first transmission bus. Wherein, a compensation time corresponding to the second driver circuit is calculated according to an output time point of the first synchronization signal and a reception time point of the second synchronization signal.

Another embodiment of the present invention discloses a driving system, which comprises a plurality of driver circuits each having a first terminal and a second terminal. The first terminal of each of the plurality of driver circuits is commonly coupled to a first transmission bus, and the second terminal of each of the plurality of driver circuits is commonly coupled to a second transmission bus. The plurality of driver circuits comprise a first driver circuit and at least one second driver circuit. Each of the at least one second driver circuit generates a notification. The first driver circuit receives the notification from each of the at least one second driver circuit, outputs a confirmation signal through the first terminal after receiving the notification from each of the at least one second driver circuit, and starts a preset operation for sensing with a delay of a compensation time for the first driver circuit after outputting the confirmation signal. The at least one second driver circuit further receives the confirmation signal through the first terminal, and starts the preset operation for sensing with a delay of a compensation time for the respective second driver circuit after receiving the confirmation signal.

Another embodiment of the present invention discloses a first driver circuit couplable to at least one second driver circuit. Each of the first driver circuit and the at least one second driver circuit has a first terminal and a second terminal. The first terminal of each of the first driver circuit and the at least one second driver circuit is commonly coupled to a first transmission bus, and the second terminal of each of the first driver circuit and the at least one second circuit is commonly coupled to a second transmission bus. The first driver circuit outputs a first synchronization signal to the first transmission bus through the first terminal, receives a second synchronization signal from the second transmission bus through the second terminal wherein the second synchronization signal is output by one of the at least one second driver circuit at the time when the one of the at least one second driver circuit receives the first synchronization signal, and calculates a compensation time corresponding to the one of the at least one second driver circuit according to an output time point of the first synchronization signal and a reception time point of the second synchronization signal.

Another embodiment of the present invention discloses a first driver circuit couplable to at least one second driver circuit. Each of the first driver circuit and the at least one second driver circuit has a first terminal and a second terminal. The first terminal of each of the first driver circuit and the at least one second driver circuit is commonly coupled to a first transmission bus, and the second terminal of each of the first driver circuit and the at least one second driver circuit is commonly coupled to a second transmission bus. The first driver circuit receives a notification from each of the at least one second driver circuit, outputs a confirmation signal through the first terminal after receiving the notification from each of the at least one second driver circuit, and starts a preset operation for sensing with a delay of a compensation time for the first driver circuit after outputting the confirmation signal.

Another embodiment of the present invention discloses a second driver circuit couplable to a first driver circuit. Each of the first driver circuit and the second driver circuit has a first terminal and a second terminal. The first terminal of each of the first driver circuit and the second driver circuit is commonly coupled to a first transmission bus, and the second terminal of each of the first driver circuit and the second driver circuit is commonly coupled to a second transmission bus. The second driver circuit generates a notification, receives a confirmation signal from the first driver circuit through the first terminal wherein the confirmation signal is generated in response to the notification, and starts a preset operation for sensing with a delay of a compensation time for the second driver circuit after receiving the confirmation signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8B and FIG. 8C are waveform diagrams of the synchronization signals on each terminal under the delay times of FIG. 8A.

FIG. 10B is a waveform diagram of the synchronization signals on each terminal under the delay times of FIG. 10A.

DETAILED DESCRIPTION

Figure 1:
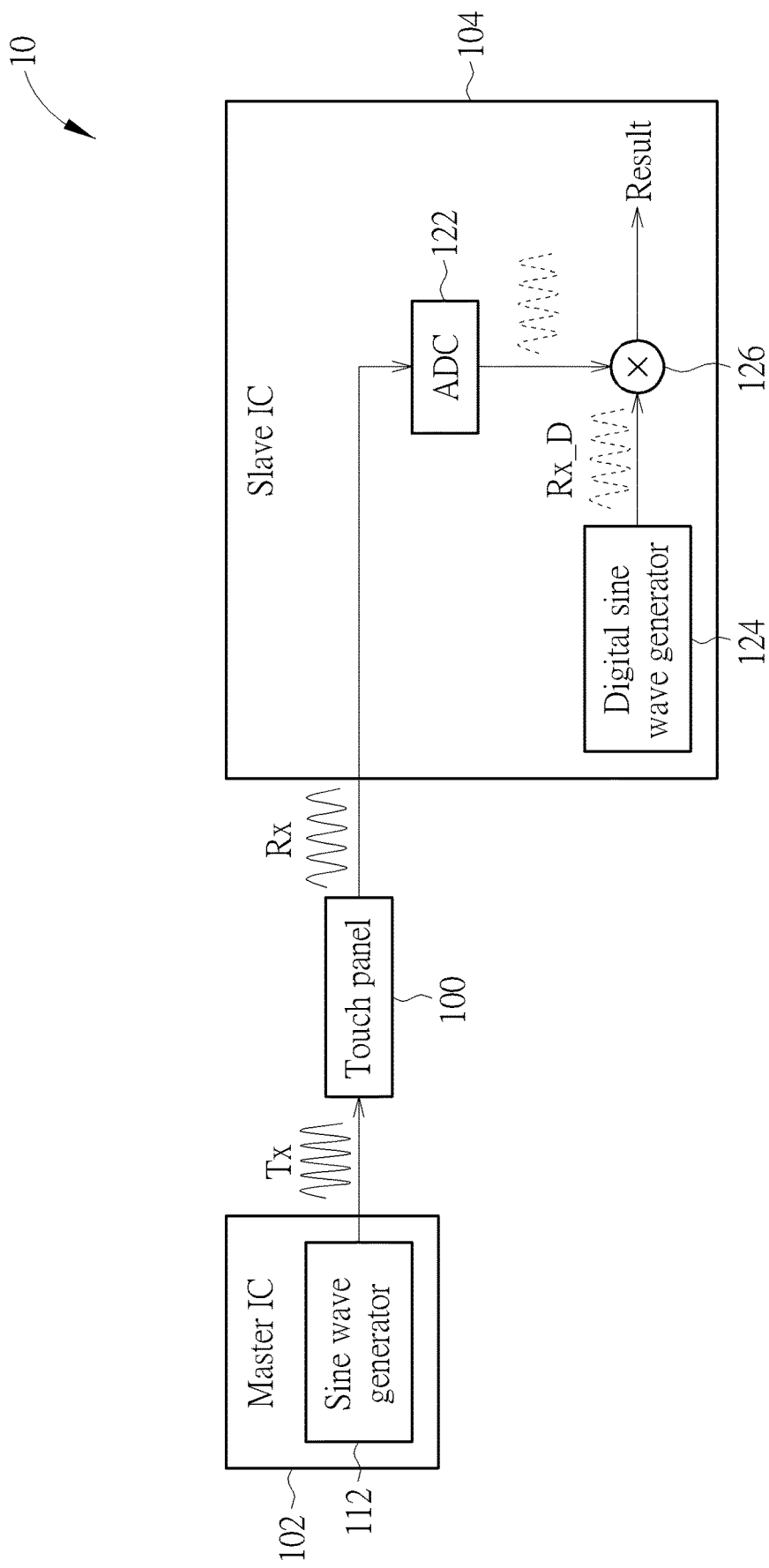
FIG. 1 is a schematic diagram of a driving system.

FIG. 1 is a schematic diagram of a driving system 10. The driving system 10 includes a touch panel 100, a master driver circuit 102 and a slave driver circuit 104. In the present invention, each of the master driver circuit and the slave driver circuit may be an integrated circuit (IC) implemented in a chip; hence, they are abbreviated as master IC and slave IC hereinafter. The master IC 102 and the slave IC 104 may cooperatively control the operations of the touch panel 100, including the touch sensing operations and display operations. Each of the master IC 102 and the slave IC 104 is responsible to control a corresponding area on the touch panel 100.

In detail, the master IC 102 may include a sine wave generator 112, which outputs a sine wave signal as a touch driving signal Tx to the touch panel 100. The slave IC 104, which may receive a touch sensing signal Rx from the touch panel 100 in response to the touch driving signal Tx of the master IC 102, includes an analog-to-digital converter (ADC) 122, a digital sine wave generator 124 and a demodulator 126. The ADC 122 may convert the received touch sensing signal Rx into digital form, which is then demodulated with another sine wave signal generated by the digital sine wave generator 124, to generate a sensing result that indicates whether a touch gesture appears and/or the touch signal intensity, for example.

The touch panel 100 may include a plurality of pixels arranged as an array, and these pixels may be connected through horizontal gate lines and vertical data lines. The gate lines and data lines may extend through the overall touch panel 100, including the area controlled by the master IC 102 and the area controlled by the slave IC 104. In addition, based on the deployment of the touch sensing pads, there may be a touch sensing pad in the area controlled by the master IC 102 connected to another touch sensing pad in the area controlled by the slave IC 104. In such a situation, during the touch sensing period, it is preferable to use the master IC 102 to output a touch driving signal to the entire touch panel 100, in order to avoid collisions of different touch driving signals from different driver ICs. The corresponding touch sensing signals from each area are then received by the respective driver IC.

As shown in FIG. 1, the touch driving signal Tx is output by the master IC 102, while the corresponding touch sensing signal Rx is received by the slave IC 104. The slave IC 104 further applies a demodulation signal Rx_D generated by the digital sine wave generator 124 to perform demodulation on the touch sensing signal Rx (through the demodulator 126). The demodulation signal Rx_D may also be a sine wave signal having identical frequency and amplitude as the touch driving signal Rx. In order to achieve a satisfactory sensing result, the demodulation signal Rx_D should be well synchronous with the touch driving signal Tx.

In a driver circuit (or driver IC), the operations of touch sensing may be initialized by using an analog sensing start signal TSHD_ANA and a sensing start signal TSHD. The analog sensing start signal TSHD_ANA may indicate an analog setting, such as the setting of an analog front-end (AFE) circuit in the driver circuit. The sensing start signal TSHD may indicate a digital setting, such as a preset operation for setting the touch sensing module in the driver circuit. In general, the analog sensing start signal TSHD_ANA may start the analog setting earlier than the sensing start signal TSHD starting the digital setting.

Figure 2:
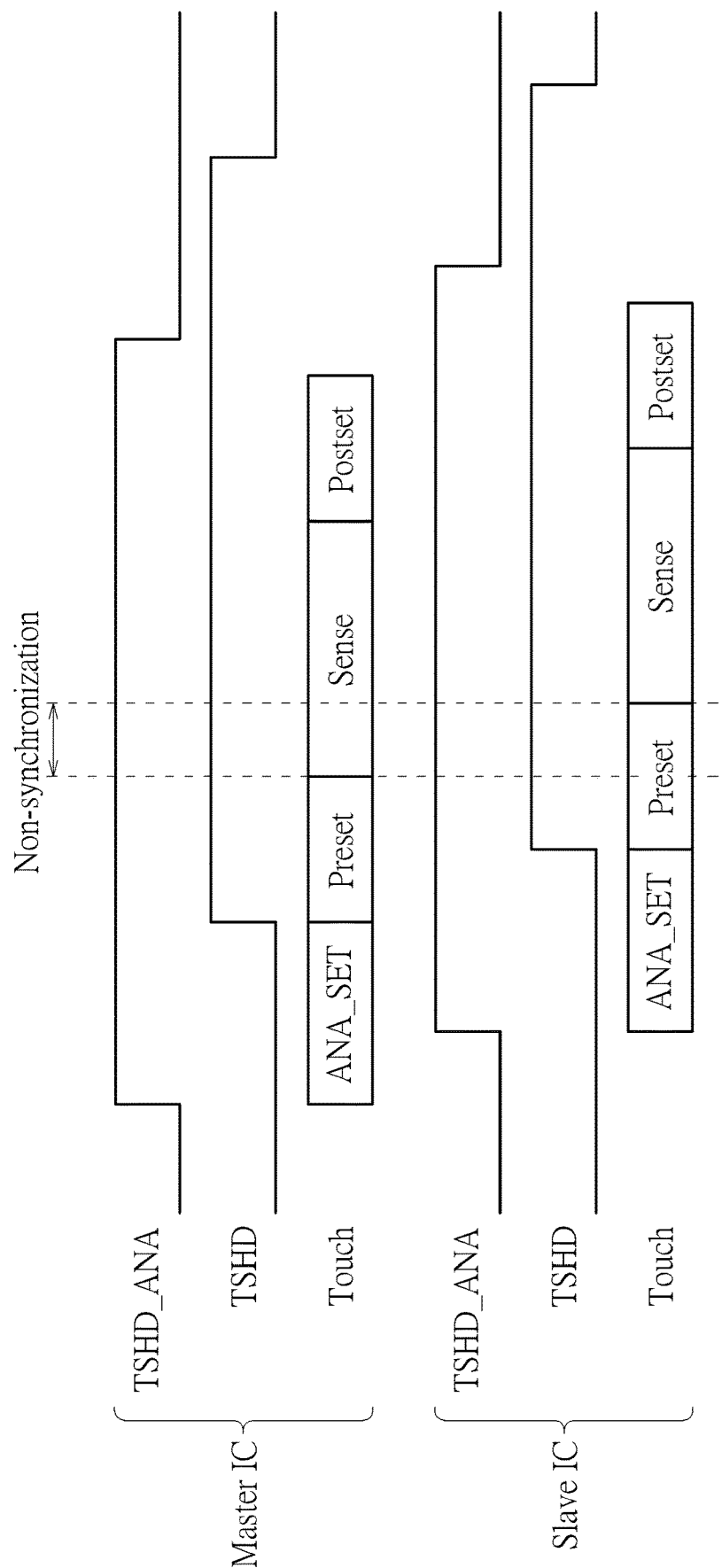
FIG. 2 illustrates the non-synchronization problem appearing in touch sensing operations.

Under a normal display mode, the analog sensing start signal TSHD_ANA and the sensing start signal TSHD of each driver circuit may be received from the master driver circuit (i.e., master IC). Conventionally, the start of touch sensing operations may not be synchronous due to the loadings of wire connections between the master IC and other slave IC(s). For example, as shown in FIG. 2, the master IC obtains the analog sensing start signal TSHD_ANA and the sensing start signal TSHD and then sends the analog sensing start signal TSHD_ANA and the sensing start signal TSHD to the slave IC. Therefore, the master IC may obtain the analog sensing start signal TSHD_ANA and the sensing start signal TSHD earlier than the slave IC. Accordingly, in the master IC, the analog setting (denoted by ANA_SET, which is started by receiving the analog sensing start signal TSHD_ANA) and the preset operation (which is started by receiving the sensing start signal TSHD) may be performed earlier than in the slave IC. The master IC then performs the sensing and postset operation earlier than the slave IC, resulting in the non-synchronization problem.

If the touch panel is operated in a dark-screen mode, each driver circuit may generate the analog sensing start signal TSHD_ANA and sensing start signal TSHD by itself. Conventionally, the master IC and the slave IC may not know the start of the touch sensing time of each other, and thus their sensing start signals TSHD_ANA and TSHD and the corresponding settings may not be synchronous.

In order to synchronize the touch sensing operations of multiple driver circuits so that these driver circuits could cooperatively control a touch panel, the driver circuits may perform a calibration mode and a synchronization mode. In the calibration mode, the timing difference of touch sensing operations between different driver circuits is calculated. In the synchronization mode, the sensing timing of each driver circuit is synchronized based on the timing information obtained in the calibration mode. For example, in the case as shown in FIG. 2, the preset operation of the master IC may be delayed by a compensation time which is calculated from a path delay between the master IC and the slave IC obtained in the calibration mode, so that the master IC and the slave IC may start the preset operation at the same time.

Figure 3:
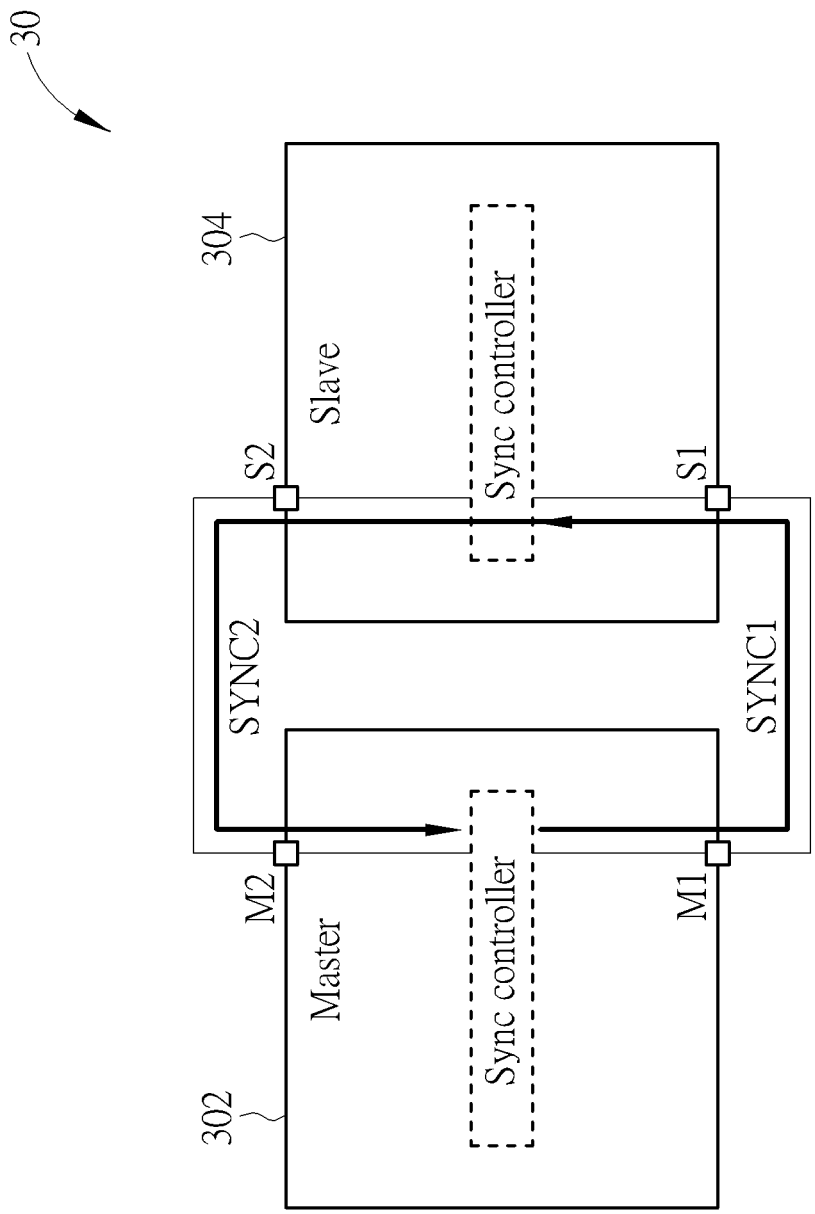
FIG. 3 is a schematic diagram of the operations of the calibration mode in a 2-IC driving system.

FIG. 3 is a schematic diagram of the operations of the calibration mode in a 2-IC driving system 30, which includes a master IC 302 and a slave IC 304. Each of the master IC 302 and the slave IC 304 may include a synchronization controller, which may be implemented in a timing controller of the driver circuit. The master IC 302 includes two terminals M1 and M2, and the slave IC 304 includes two terminals S1 and S2. The terminal M1 of the master IC 302 is connected to the terminal S1 of the slave IC 304, and the terminal M2 of the master IC 302 is connected to the terminal S2 of the slave IC 304.

As shown in FIG. 3, in the calibration mode, the master IC 302 first outputs a first synchronization signal SYNC1 through the terminal M1 and starts a timer. The first synchronization signal SYNC1 is then forwarded to the terminal S1 of the slave IC 304. At the time when the slave IC 304 receives the first synchronization signal SYNC1, the slave IC 304 may output a second synchronization signal SYNC2 through the terminal S2 accordingly. The second synchronization signal SYNC2 is then forwarded to the terminal M2 of the master IC 302. When the master IC 302 receives the second synchronization signal SYNC2, the master IC 302 stops the timer and records the timer result. The timer result indicates a path delay between the master IC 302 and the slave IC 304, where the path delay refers to the round-trip propagation time including propagation from the master IC 302 to the slave IC 304 and propagation from the slave IC 304 back to the master IC 302. The master IC 302 then calculates a compensation time according to the path delay. Assume that the path length between the terminals M1 and S1 is identical to the path length between the terminals M2 and S2. The compensation time may be substantially equal to one half of the path delay.

In an embodiment, the operations of the timer record and calculation may be performed in the synchronization controller included in each of the master IC 302 and the slave IC 304, as shown in FIG. 3.

Figure 4:
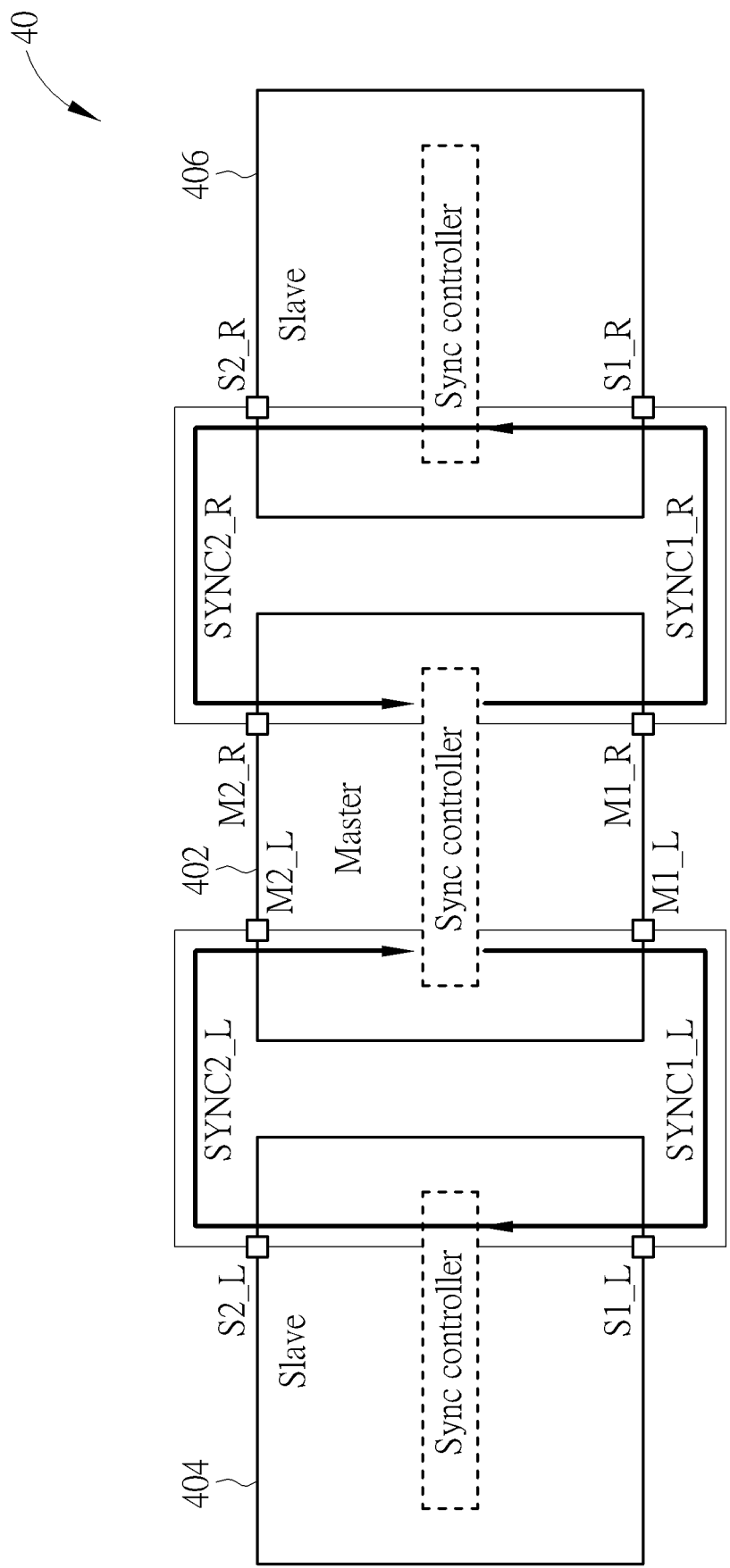
FIG. 4 is a schematic diagram of the operations of the calibration mode in a 3-IC driving system.

Note that the operations of the calibration mode are also applicable to more than 2 driver circuits. FIG. 4 is a schematic diagram of the operations of the calibration mode in a 3-IC driving system 40, which includes a master IC 402 and two slave ICs 404 and 406. Similarly, each of the master IC 402 and the slave ICs 404 and 406 may include a synchronization controller for performing the calibration operations. The master IC 402 includes four terminals, where two terminals M1_L and M2_L are connected to the slave IC 404, and two terminals M1_R and M2_R are connected to the slave IC 406. The slave IC 404 includes two terminals S1_L and S2_L, which are connected to the terminals M1_L and M2_L, respectively. The slave IC 406 includes two terminals S1_R and S2_R, which are connected to the terminals M1_R and M2_R, respectively.

In a similar manner, the master IC 402 may output a first left synchronization signal SYNC1_L to the slave IC 404 through the terminal M1_L, and the slave IC 404 returns a second left synchronization signal SYNC2_L to the master IC 402 through the terminal S2_L. The master IC 402 may use a timer to record the output time point of the first left synchronization signal SYNC1_L and the reception time point of the second left synchronization signal SYNC2_L, and calculate the path delay and compensation time corresponding to the slave IC 404 accordingly. Similarly, the master IC 402 may also output a first right synchronization signal SYNC1_R to the slave IC 406 through the terminal M1_R, and the slave IC 406 returns a second right synchronization signal SYNC2_R to the master IC 402 through the terminal S2_R. The master IC 402 may also use the timer to record the output time point of the first right synchronization signal SYNC1_R and the reception time point of the second right synchronization signal SYNC2_R, and calculate the path delay and compensation time corresponding to the slave IC 406 accordingly.

Figure 5A:
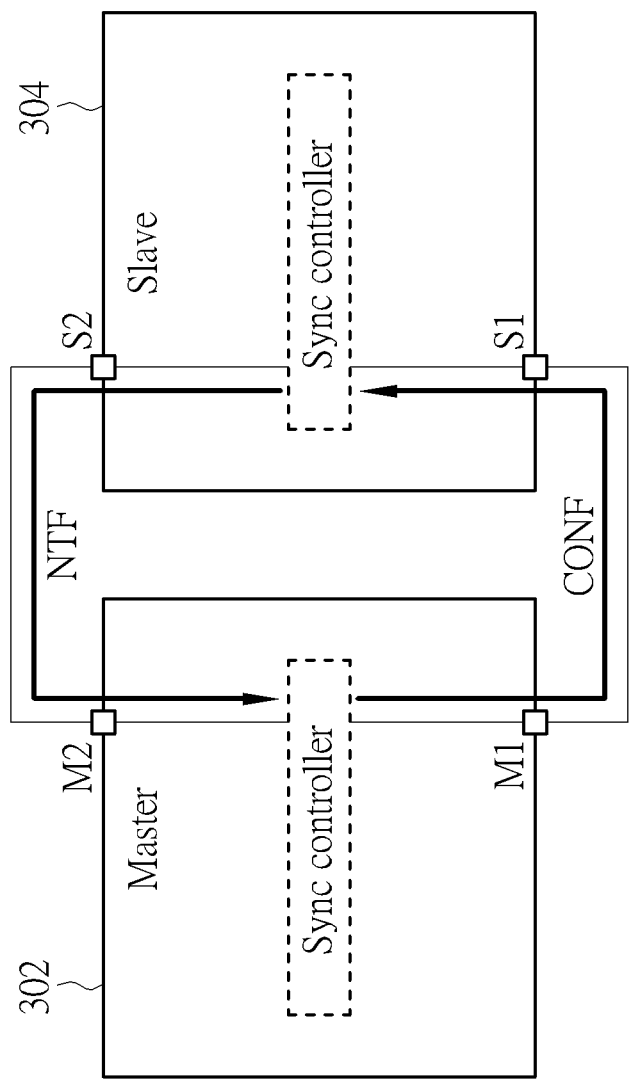
FIG. 5A is a schematic diagram of the operations of the synchronization mode in a 2-IC driving system.
Figure 5B:
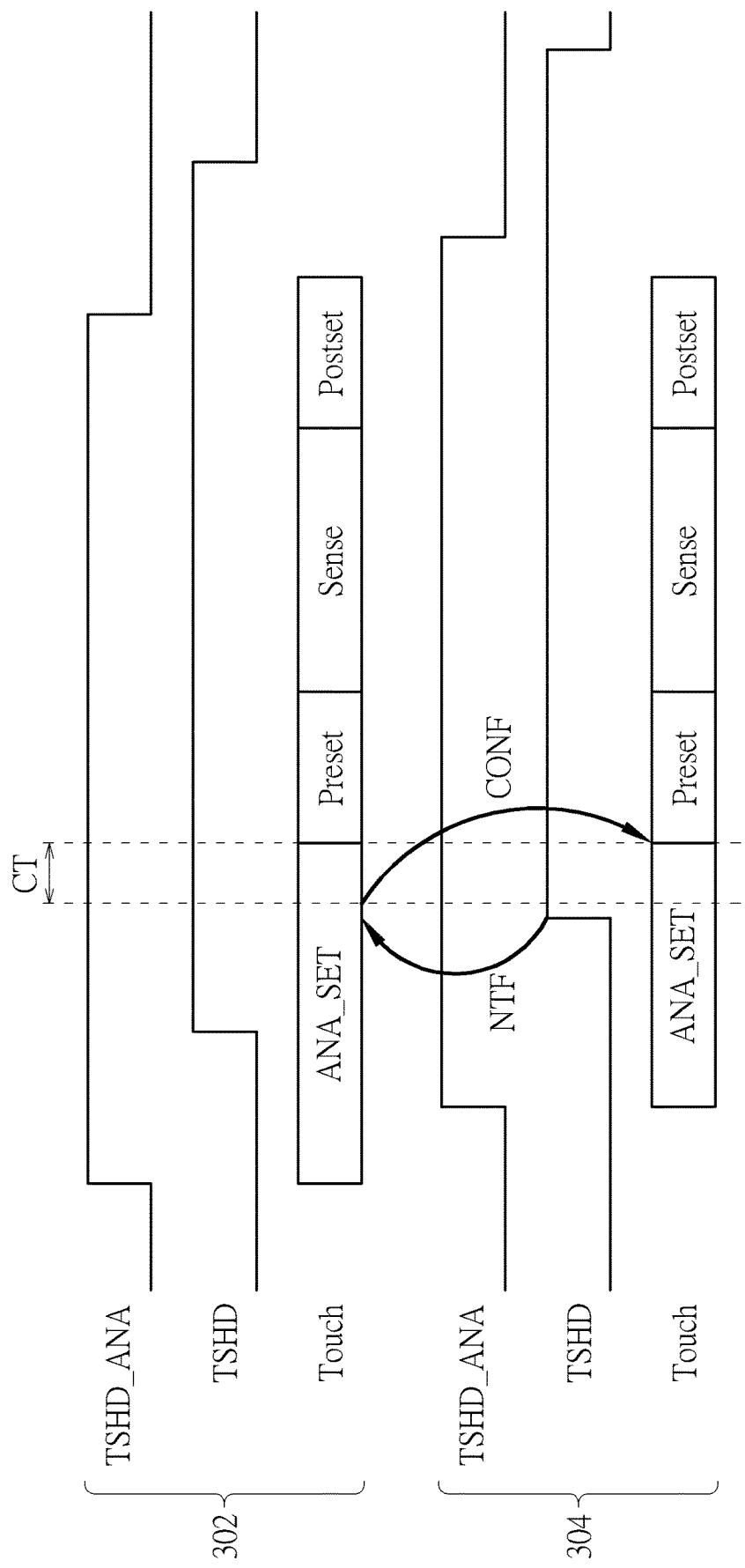
FIG. 5B is a waveform diagram of the touch sensing operations of the master IC and the slave IC shown in FIG. 5A.

FIG. 5A is a schematic diagram of the operations of the synchronization mode in a 2-IC driving system, where the 2-IC driving system 30 shown in FIG. 3 is taken as an example. FIG. 5B is a waveform diagram of the touch sensing operations of the master IC 302 and the slave IC 304, where the synchronization mode may be performed during a touch sensing period. When a touch panel cooperatively controlled by the master IC 302 and the slave IC 304 needs to perform touch sensing, each of the master IC 302 and the slave IC 304 may obtain sensing start signals TSHD_ANA and TSHD. The analog sensing start signal TSHD_ANA indicates the start of analog setting (ANA_SET), and the sensing start signal TSHD is applied to start the preset operation for touch sensing.

More specifically, the master IC 302 may first determine whether the slave IC 304 is ready to start touch sensing. For example, when receiving or obtaining the sensing start signal TSHD, the slave IC 304 may send a notification NTF to the master IC 302 through the terminal S2. When the master IC 302 receives the notification NTF through the terminal M2 and obtains the sensing start signal TSHD, it may send a confirmation signal CONF to the slave IC 304 through the terminal M1. After sending the confirmation signal CONF, the master IC 302 may then start the preset operation for touch sensing with a delay of a compensation time CT obtained in the calibration mode, where the compensation time CT may be substantially equal to one half of the path delay between the master IC 302 and the slave IC 304 as described above. When the slave IC 304 receives the confirmation signal CONF through the terminal S1, the slave IC 304 may immediately start the preset operation for touch sensing. With appropriate setting of the compensation time CT, the master IC 302 and the slave IC 304 may start the preset operation at the same time, and thereby perform touch sensing synchronously.

Figure 6A:
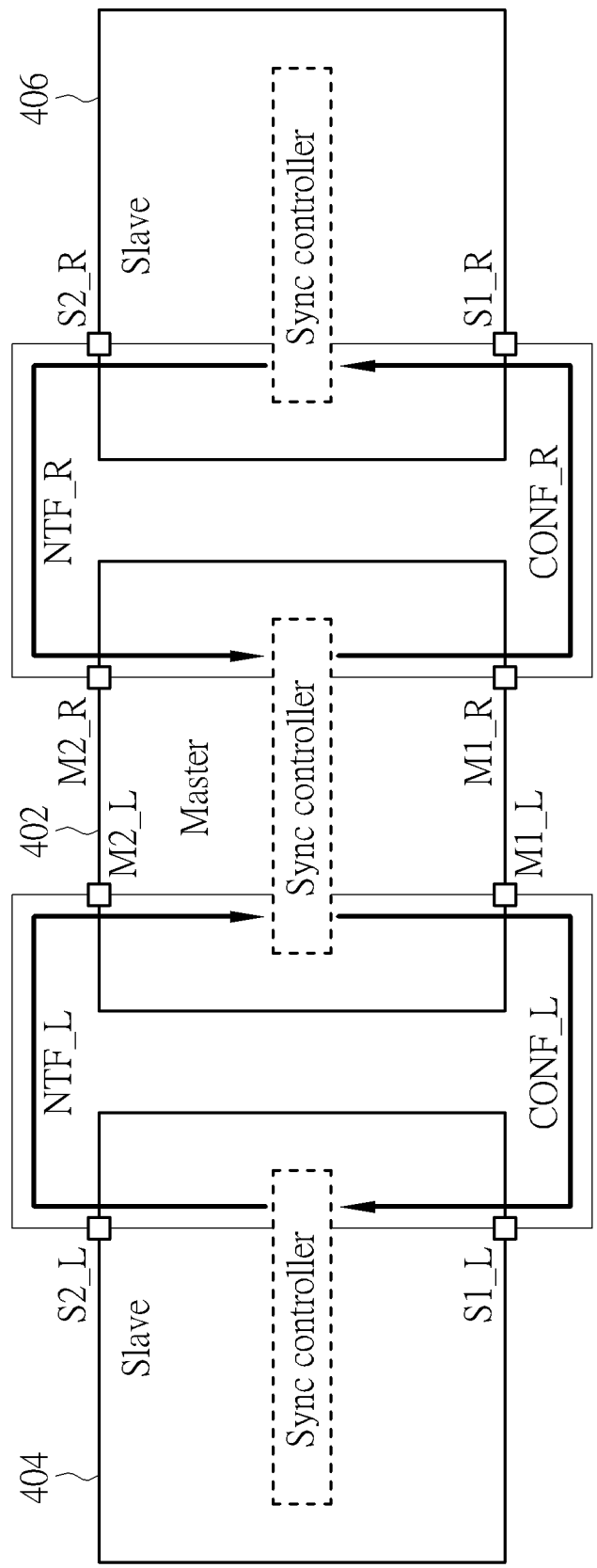
FIG. 6A is a schematic diagram of the operations of the synchronization mode in a 3-IC driving system.
Figure 6B:
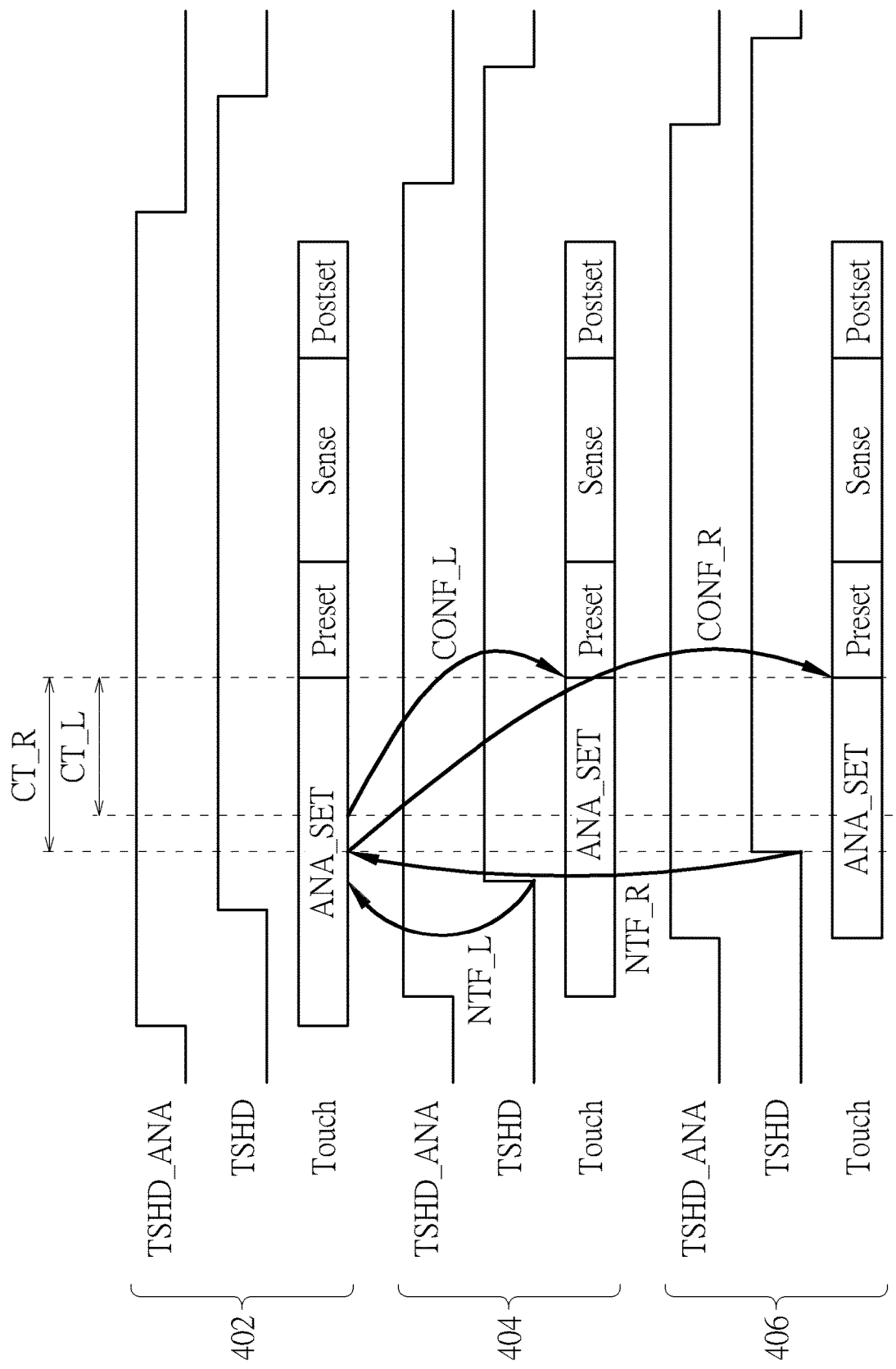
FIG. 6B is a waveform diagram of the touch sensing operations of the master IC and the slave ICs shown in FIG. 6A.

Note that the operations of the synchronization mode is also applicable to more than 2 driver circuits. FIG. 6A is a schematic diagram of the operations of the synchronization mode in a 3-IC driving system, where the 3-IC driving system 40 shown in FIG. 4 are taken as an example. FIG. 6B is a waveform diagram of the touch sensing operations of the master IC 402 and the slave ICs 404 and 406, where the synchronization mode may be performed during a touch sensing period. In this case, the master IC 402 may obtain a compensation time CT L corresponding to the slave IC 404 and a compensation time CT R corresponding to the slave IC 406 in the calibration mode.

Similarly, when a touch panel cooperatively controlled by the master IC 402 and the slave ICs 404 and 406 needs to perform touch sensing, each of the master IC 402 and the slave ICs 404 and 406 may obtain sensing start signals TSHD_ANA and TSHD. The analog sensing start signal TSHD_ANA indicates the start of analog setting (ANA_SET), and the sensing start signal TSHD is applied to start the preset operation for touch sensing. The slave IC 404 may send a notification NTF_L to the master IC 402 through the terminal S2_L when receiving or obtaining the sensing start signal TSHD, and the slave IC 406 may send a notification NTF_R to the master IC 402 through the terminal S2_R when receiving or obtaining the sensing start signal TSHD. When the master IC 402 receives the notification NTF_L through the terminal M2_L, receives the notification NTF_R through the terminal M2_R, and obtains the sensing start signal TSHD, it may send a confirmation signal CONF_L to the slave IC 404 through the terminal M1_L and send a confirmation signal CONF_R to the slave IC 406 through the terminal M1_R. After sending the confirmation signals CONF_R and CONF_L, the master IC 302 may then start the preset operation for touch sensing with a delay based on the compensation times CT L and CT R obtained in the calibration mode. When the slave ICs 404 and 406 receive the confirmation signals CONF_L and CONF_R through the terminal S1_L and S1_R, respectively, the slave ICs 404 and 406 may immediately start the preset operation for touch sensing. With appropriate delay of the compensation times CT L and CT R, the master IC 402 and the slave ICs 404 and 406 may start the preset operation at the same time, and thereby perform touch sensing synchronously.

Note that the master IC 402 may adjust the output time point of the confirmation signals CONF_L and CONF_R if the compensation times CT L and CT R for the slave ICs 404 and 406 are different. For example, as shown in FIG. 6B, the compensation time CT R is greater than the compensation time CT L, which means that the right transmission path of the master IC 402 may be longer than the left transmission path of the master IC 402. Therefore, the master IC 402 may output the confirmation signal CONF_R to the right-side slave IC 406 earlier than the confirmation signal CONF_L to the left-side slave IC 404, allowing the confirmation signals CONF_L and CONF_R to reach the corresponding slave ICs 404 and 406 at the same time.

In an embodiment, the start time of the preset operation in each driver IC may further be tuned or delayed manually, in order to achieve a preferable synchronization performance.

Based on the operations of the calibration mode and synchronization mode described above, the present invention provides a novel driving system, which may support the cooperation of more than 3 driver circuits for commonly controlling a touch panel. In several embodiments of the present invention, the driving system may include more than 3 driver circuits, of which 1 driver circuit is configured as a master IC and other driver circuits are configured as slave ICs. In other words, the driving system may include 1 master IC and more than 2 slave ICs.

Figure 7A:
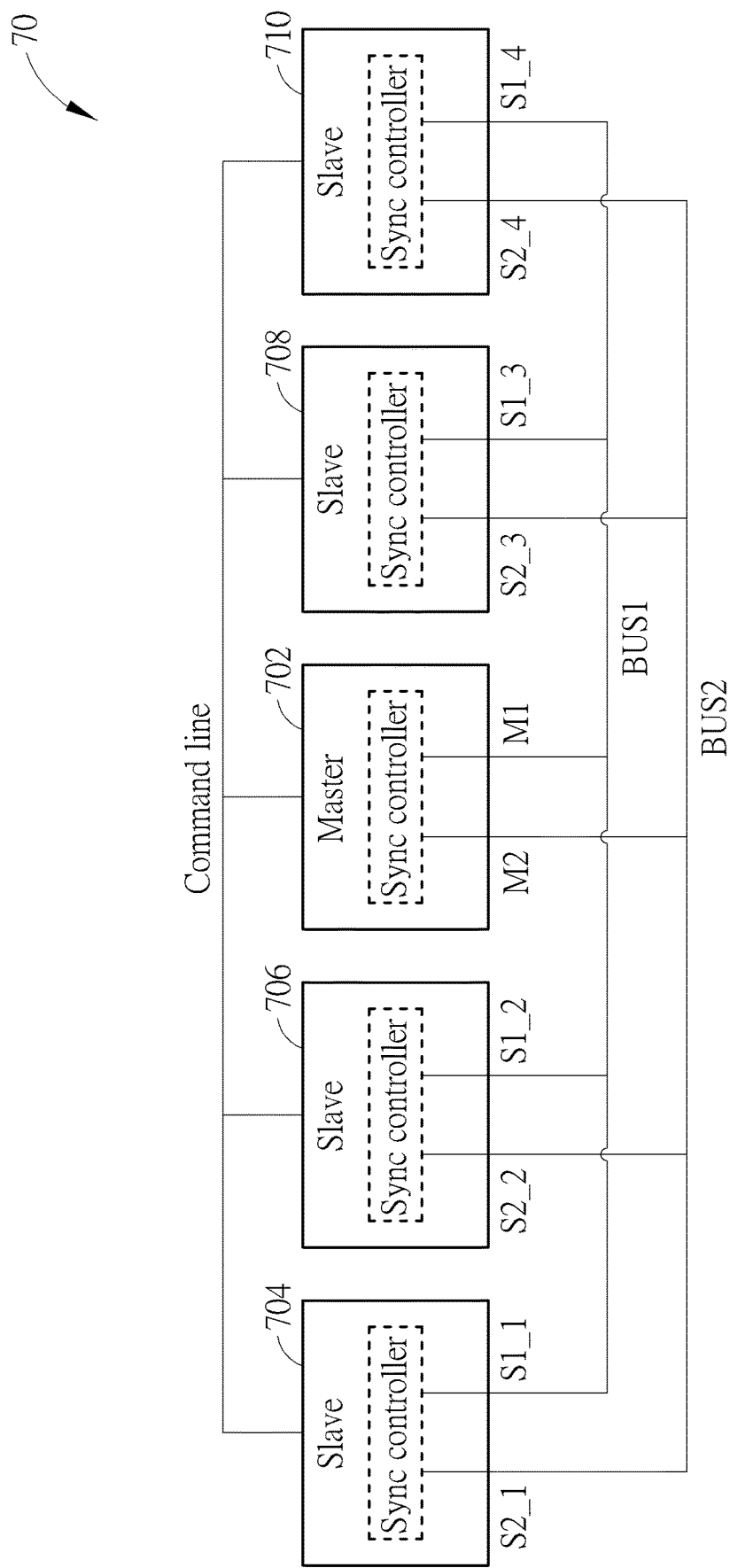
FIG. 7A is a schematic diagram of a driving system according to an embodiment of the present invention.

FIG. 7A is a schematic diagram of a driving system 70 according to an embodiment of the present invention. The driving system 70 includes 5 driver circuits, which have 1 master IC 702 and 4 slave ICs 704, 706, 708 and 710. Each driver circuit has two terminals. More specifically, the master IC 702 has two terminals M1 and M2, the slave IC 704 has two terminals S1_1 and S2_1, the slave IC 706 has two terminals S1_2 and S2_2, the slave IC 708 has two terminals S1_3 and S2_3, and the slave IC 710 has two terminals S1_4 and S2_4. Each of the terminals may be an I/O pin of an IC that implements the driver circuit. The terminals M1, S1_1, S1_2, S1_3 and S1_4 are commonly coupled to a transmission bus BUS1, and the terminals M2, S2_1, S2_2, S2_3 and S2_4 are commonly coupled to a transmission bus BUS2. In this embodiment, a command line may also be coupled to each driver circuit for communications between the driver circuits. In another embodiment, the command line may be omitted. Each of the master IC 702 and the slave ICs 704-710 may include a synchronization controller, for performing the calibration and synchronization operations in each driver circuit. The transmission buses BUS1 and BUS2 may be coupled to the synchronization controller inside the master IC 702 and the slave ICs 704-710.

In the driving system 70, the master IC 702 is deployed in the middle, where two slave ICs 704 and 706 are located at the left side of the master IC 702, and other two slave ICs 708 and 710 are located at the right side of the master IC 702.

With the connections of the driving system 70, a closed loop may be formed between every two driver circuits. For example, the master IC 702 may form a closed loop with any of the slave ICs 704-710 through the transmission buses BUS1 and BUS2. A slave IC (e.g., 704) may also form a closed loop with another slave IC (e.g., 706) through the transmission buses BUS1 and BUS2. In such a situation, the path delay between any two driver circuits may be obtained. In addition, with the synchronization signals forwarded between two driver circuits, the path delay of another driver circuit between these two driver circuits may also be obtained. In other words, multiple path delays between different driver circuits may be obtained in one calibration operation. As a result, the operations of the calibration mode may be performed in any appropriate manner to obtain the required path delays and calculate the corresponding compensation times.

Figure 7B:
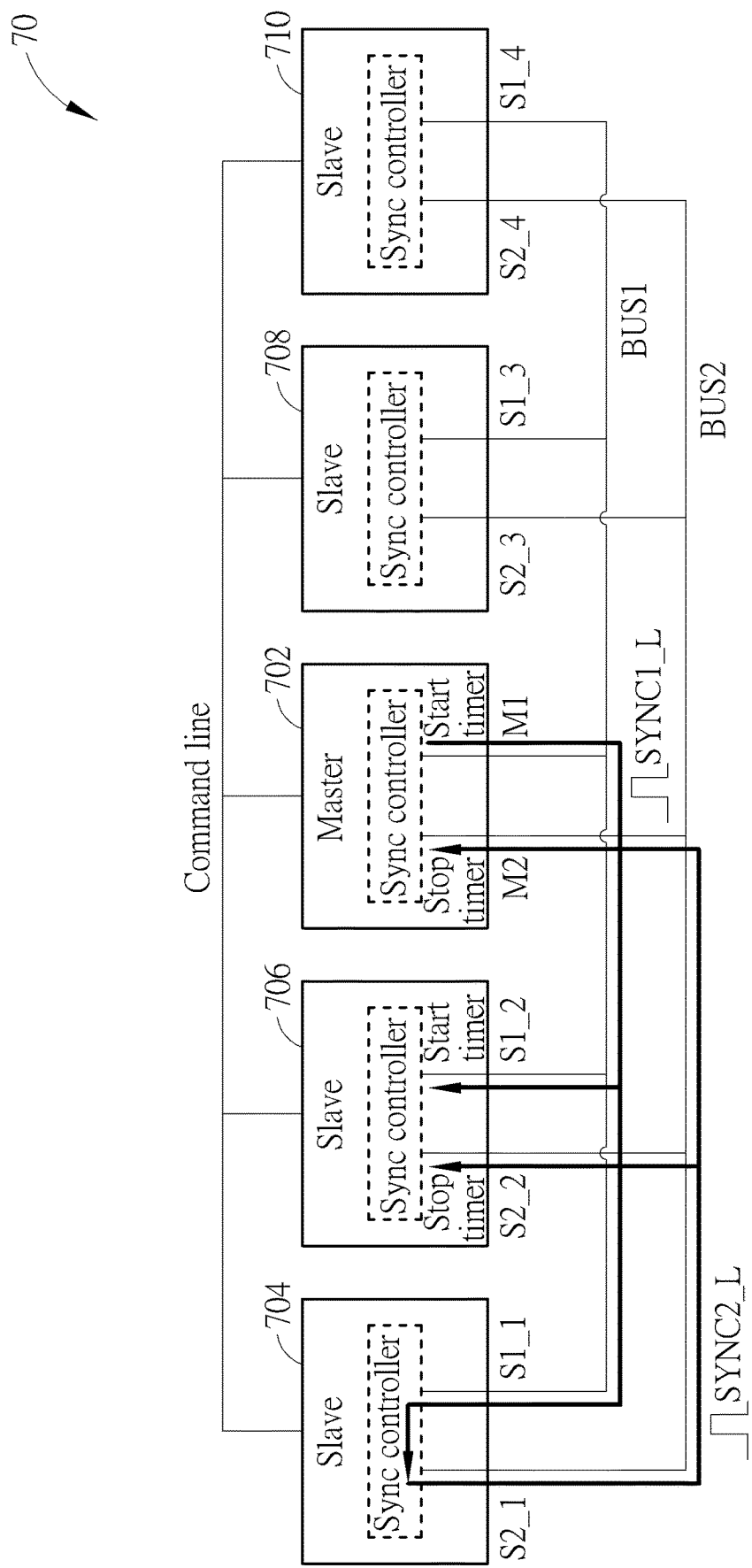
FIG. 7B and FIG. 7C illustrate exemplary operations of the calibration mode performed on the driving system shown in FIG. 7A.

FIG. 7B illustrates an exemplary operation of the calibration mode performed on the driving system 70. As shown in FIG. 7B, the master IC 702 may be applied as the start point of signal transmission for measuring the path delays corresponding to the left-side slave ICs 704 and 706. More specifically, the master IC 702 may first output a first left synchronization signal SYNC1_L to the transmission bus BUS1 through the terminal M1, and meanwhile start a timer. The first left synchronization signal SYNC1_L is then forwarded on the transmission bus BUS1. At the time when the left-most slave IC 704 receives the first left synchronization signal SYNC1_L from the transmission bus BUS1, this slave IC 704 may output a second left synchronization signal SYNC2_L to the transmission bus BUS2 through the terminal S2_1. The second left synchronization signal SYNC2_L is forwarded on the transmission bus BUS2 and then received by the master IC 702, and the master IC 702 may stop the timer when receiving the second left synchronization signal SYNC2_L. In this manner, the master IC 702 may obtain the path delay between the master IC 702 and the slave IC 704 according to the timer result, which records a time difference between the output time point of the first left synchronization signal SYNC1_L and the reception time point of the second left synchronization signal SYNC2_L. Subsequently, the master IC 702 may calculate and obtain the compensation time corresponding to the slave IC 704 according to the path delay.

In an embodiment, the value of the path delay may be divided by 2 to obtain the compensation time for the master IC 702 or the slave IC 704, to be used in the synchronization mode to synchronize the sensing time of the master IC 702 and the slave IC 704. In addition, the compensation time may further be manually adjusted or tuned to achieve an optimal synchronization result.

The first left synchronization signal SYNC1_L and the second left synchronization signal SYNC2_L may also be applied to calibrate the slave IC 706. More specifically, the first left synchronization signal SYNC1_L forwarded on the transmission bus BUS1 and the second left synchronization signal SYNC2_L forwarded on the transmission bus BUS2 may also be received by the slave IC 706. When the slave IC 706 receives the first left synchronization signal SYNC1_L from the transmission bus BUS1 through the terminal S1_2, it may start a timer. Afterwards, when the slave IC 706 receives the second left synchronization signal SYNC2_L from the transmission bus BUS2 through the terminal S2_2, it may stop the timer. Therefore, the timer of the slave IC 706 will record a time difference between the reception time point of the first left synchronization signal SYNC1_L and the reception time point of the second left synchronization signal SYNC2_L, and this is equivalent to the path delay between the slave ICs 704 and 706.

Subsequently, the slave IC 706 may send the recorded timer information to the master IC 702, e.g., through the command line. The master IC 702 may obtain the path delay between the slave ICs 704 and 706 based on the information received from the slave IC 706. Alternatively or additionally, the slave IC 706 may store the recorded timer information to be used in itself in the subsequent synchronization mode.

As a result, the master IC 702 may obtain the compensation times for the slave ICs 704 and 706 located at the left side of the master IC 702 in one calibration operation where one synchronization signal is output to the transmission bus BUS1 and one synchronization signal is output to the transmission bus BUS2.

Figure 7C:
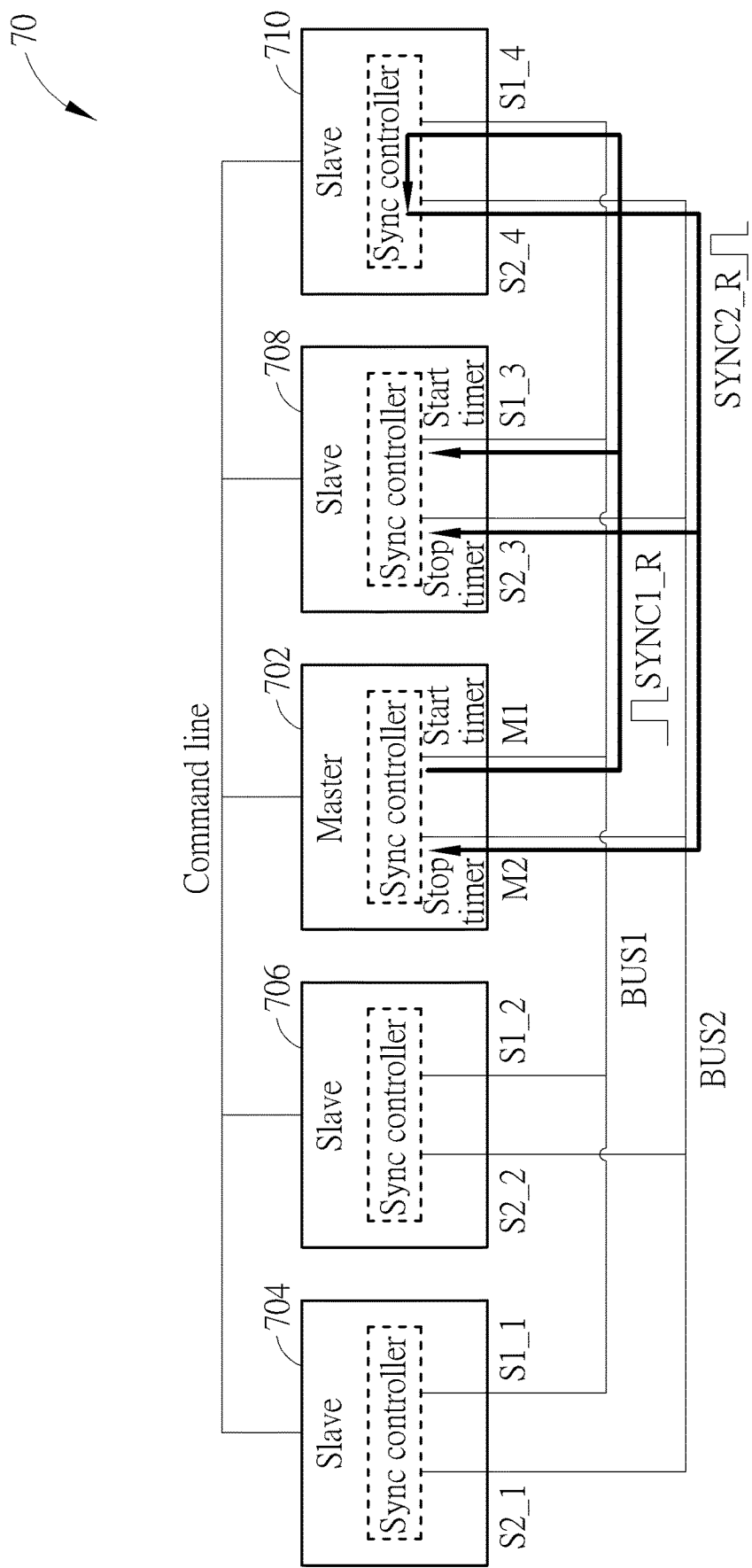

In a similar manner, another transmission is performed to calibrate the slave ICs 708 and 710 at the right side of the master IC 702, as shown in FIG. 7C. The master IC 702 may first output a first right synchronization signal SYNC1_R to the transmission bus BUS1 through the terminal M1, and meanwhile start a timer. The first right synchronization signal SYNC1_R is then forwarded on the transmission bus BUS1. At the time when the right-most slave IC 710 receives the first right synchronization signal SYNC1_R from the transmission bus BUS1, this slave IC 710 may output a second right synchronization signal SYNC2_R to the transmission bus BUS2 through the terminal S2_4. The second right synchronization signal SYNC2_R is forwarded on the transmission bus BUS2 and then received by the master IC 702, and the master IC 702 may stop the timer when receiving the second right synchronization signal SYNC2_R. In this manner, the master IC 702 may obtain the path delay between the master IC 702 and the slave IC 710 according to the timer result, which records a time difference between the output time point of the first right synchronization signal SYNC1_R and the reception time point of the second right synchronization signal SYNC2_R. Subsequently, the master IC 702 may calculate and obtain the compensation time corresponding to the slave IC 710 according to the path delay.

In an embodiment, the value of the path delay may be divided by 2 to obtain the compensation time corresponding to the slave IC 710, to be used in the synchronization mode to synchronize the sensing time of the master IC 702 and the slave IC 710. In addition, the compensation time may further be manually adjusted or tuned to achieve an optimal synchronization result.

The first right synchronization signal SYNC1_R and the second right synchronization signal SYNC2_R may also be applied to calibrate the slave IC 708. More specifically, the first right synchronization signal SYNC1_R forwarded on the transmission bus BUS1 and the second right synchronization signal SYNC2_R forwarded on the transmission bus BUS2 may also be received by the slave IC 708. When the slave IC 708 receives the first right synchronization signal SYNC1_R from the transmission bus BUS1 through the terminal S1_3, it may start a timer. Afterwards, when the slave IC 708 receives the second right synchronization signal SYNC2_R from the transmission bus BUS2 through the terminal S2_3, it may stop the timer. Therefore, the timer of the slave IC 708 will record a time difference between the reception time point of the first right synchronization signal SYNC1_R and the reception time point of the second right synchronization signal SYNC2_R, and this is equivalent to the path delay between the slave ICs 708 and 710.

Subsequently, the slave IC 708 may send the recorded timer information to the master IC 702, e.g., through the command line. The master IC 702 may obtain the path delay between the slave ICs 708 and 710 based on the information received from the slave IC 708. Alternatively or additionally, the slave IC 708 may store the recorded timer information to be used in itself in the subsequent synchronization mode.

As a result, the master IC 702 may obtain the compensation times for the slave ICs 708 and 710 located at the right side of the master IC 702 in another one calibration operation where one synchronization signal is output to the transmission bus BUS1 and one synchronization signal is output to the transmission bus BUS2.

As can be seen, the path delays of multiple driver circuits may be obtained in one calibration operation, and the compensation time information of all driver circuits in the driving system 70 may be completely obtained in only two calibration operations.

Figure 8A:
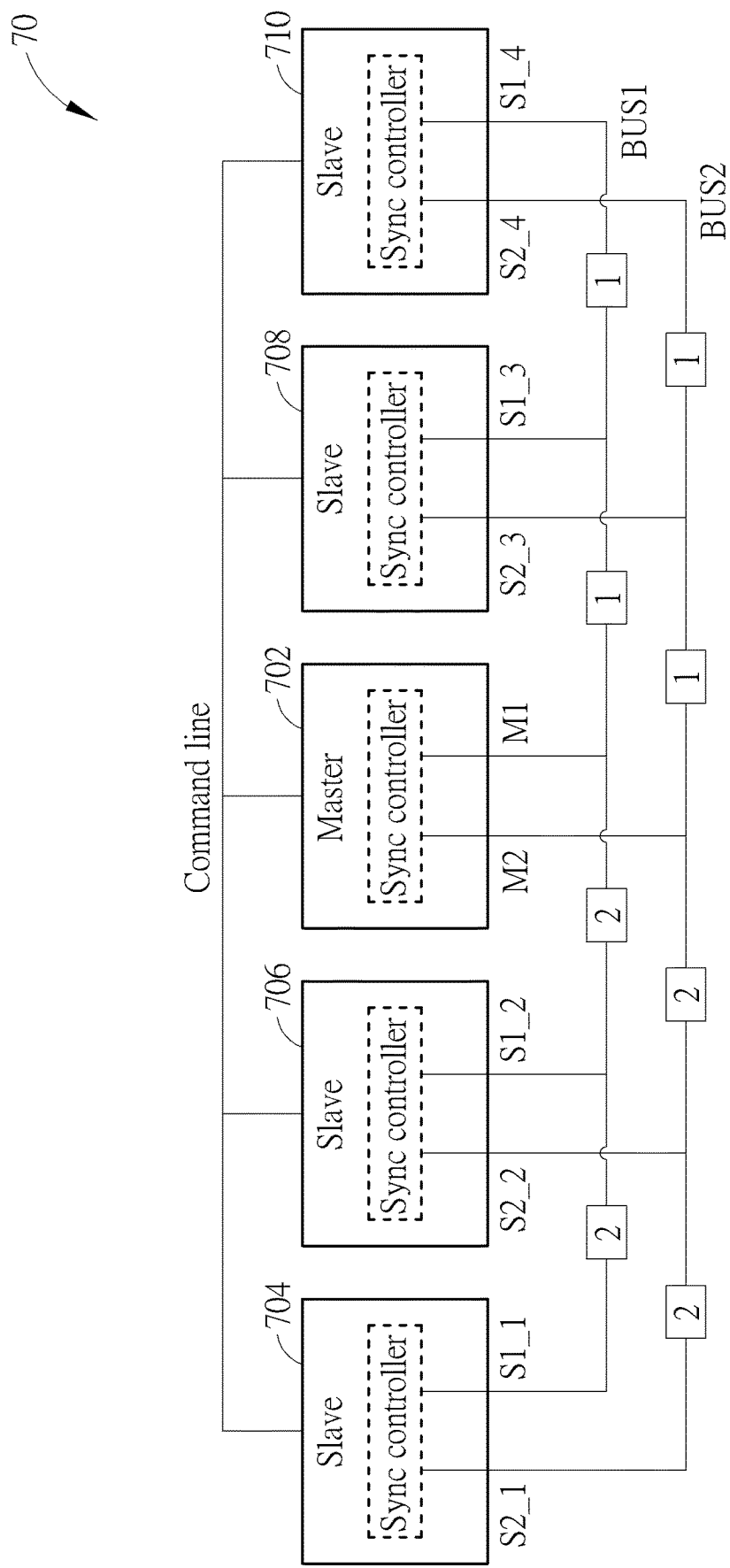
FIG. 8A illustrates the calibration operation for obtaining path delay in the driving system shown in FIG. 7 according to an embodiment of the present invention.
Figure 8B:
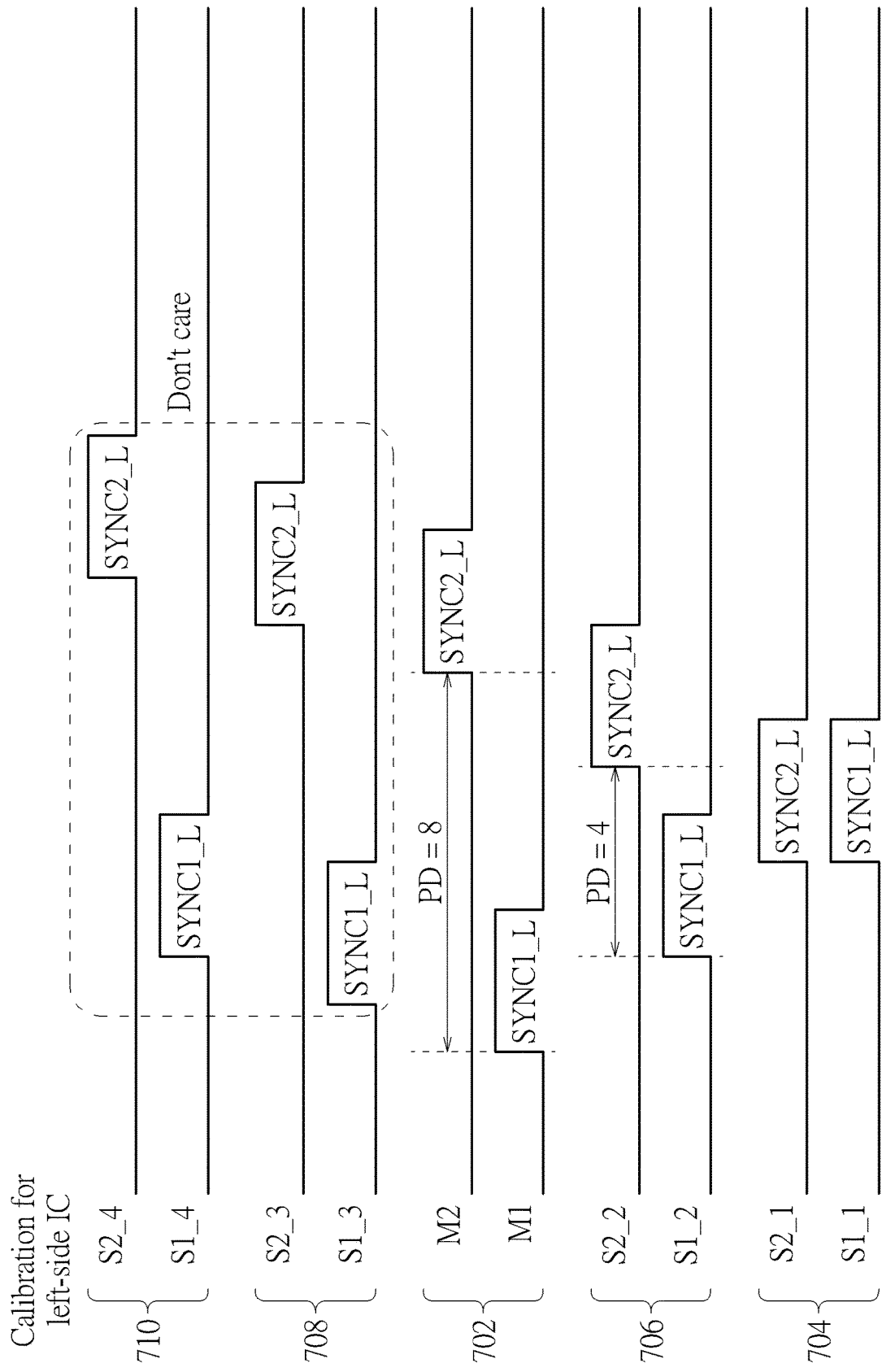

FIG. 8A illustrates the calibration operation for obtaining path delay in the driving system 70 according to an embodiment of the present invention, where the values of delay times are labeled on the corresponding paths of the transmission buses. FIGS. 8B and 8C are waveform diagrams of the synchronization signals on each terminal under the delay times, where FIG. 8B illustrates the operations for calibrating the slave ICs 704 and 706 at the left side, and FIG. 8C illustrates the operations of calibrating the slave ICs 708 and 710 at the right side. In FIGS. 8B and 8C, the synchronization signals SYNC1_L, SYNC1_R, SYNC2_L and SYNC2_R are pulse signals, but those skilled in the art would know that the implementation is not limited thereto.

As shown in FIG. 8B, the master IC 702 first outputs the first left synchronization signal SYNC1_L through the terminal M1 and starts a timer. The first left synchronization signal SYNC1_L is forwarded through the transmission bus BUS1 and reaches the terminal S1_2 of the slave IC 706 after a delay time 2. At this moment, the slave IC 706 starts a timer in response to the reception of the first left synchronization signal SYNC1_L. The first left synchronization signal SYNC1_L is then forwarded through the transmission bus BUS1 and reaches the terminal S1_1 of the slave IC 704 after another delay time 2. The slave IC 704 sends back the second left synchronization signal SYNC2_L through the terminal S2_1 when receiving the first left synchronization signal SYNC1_L. The second left synchronization signal SYNC2_L is forwarded through the transmission bus BUS2 and reaches the terminal S2_2 of the slave IC 706 after a delay time 2. At this moment, the slave 706 stops the timer in response to the reception of the second left synchronization signal SYNC2_L. The timer of the slave IC 706 will record the path delay (denoted by PD) between the slave ICs 704 and 706, which is equal to 4.

The second left synchronization signal SYNC2_L is then forwarded through the transmission bus BUS2 and reaches the terminal M2 of the master IC 702 after another delay time 2. At this moment, the master IC 702 stops the timer in response to the reception of the second left synchronization signal SYNC2_L. The timer of the master IC 702 will record the path delay between the master IC 702 and the left-most slave IC 704, which is equal to 8.

This calibration operation is applied to the left-side slave ICs 704 and 706, and thus the synchronization signals SYNC1_L and SYNC2_L are ignored or regarded as "don't care" signals by the right-side slave ICs 708 and 710.

Based on the value of the timer, the compensation time required between the slave ICs 704 and 706 is calculated as 4/2=2, and the compensation time required between the slave IC 704 and the master IC 702 is calculated as 8/2=4. Therefore, the corresponding driver circuits may take the compensation time information to be used in the subsequent synchronization mode.

FIG. 8C illustrates another calibration operation for calibrating the right-side slave ICs 708 and 710. As shown in FIG. 8C, the master IC 702 first outputs the first right synchronization signal SYNC1_R through the terminal M1 and starts a timer. The first right synchronization signal SYNC1_R is forwarded through the transmission bus BUS1 and reaches the terminal S1_3 of the slave IC 708 after a delay time 1. At this moment, the slave IC 708 starts a timer in response to the reception of the first right synchronization signal SYNC1_R. The first right synchronization signal SYNC1_R is then forwarded through the transmission bus BUS1 and reaches the terminal S1_4 of the slave IC 710 after another delay time 1. The slave IC 710 sends back the second right synchronization signal SYNC2_R through the terminal S2_4 when receiving the first right synchronization signal SYNC1_R. The second right synchronization signal SYNC2_R is forwarded through the transmission bus BUS2 and reaches the terminal S2_3 of the slave IC 708 after a delay time 1. At this moment, the slave IC 708 stops the timer in response to the reception of the second right synchronization signal SYNC2_R. The timer of the slave IC 708 will record the path delay between the slave ICs 708 and 710, which is equal to 2.

The second right synchronization signal SYNC2_R is then forwarded through the transmission bus BUS2 and reaches the terminal M2 of the master IC 702 after another delay time 1. At this moment, the master IC 702 stops the timer in response to the reception of the second right synchronization signal SYNC2_R. The timer of the master IC 702 will record the path delay between the master IC 702 and the right-most slave IC 710, which is equal to 4.

This calibration operation is applied to the right-side slave ICs 708 and 710, and thus the synchronization signals SYNC1_R and SYNC2_R are ignored or regarded as "don't care" signals by the left-side slave ICs 704 and 706.

Based on the value of the timer, the compensation time required between the slave ICs 708 and 710 is calculated as 2/1=1, and the compensation time required between the slave IC 710 and the master IC 702 is calculated as 4/2=2. Therefore, the corresponding driver circuits may take the compensation time information to be used in the subsequent synchronization mode.

In this embodiment, the compensation times for the left-side slave ICs 704 and 706 are obtained in one calibration operation, and the compensation times for the right-side slave ICs 708 and 710 are obtained in another calibration operation. If the path delays for the left-side slave ICs are not symmetric to the path delays for the right-side slave ICs, an offset may further be used to modify or adjust the compensation times, in order to synchronize the slave ICs at both sides.

More specifically, as shown in FIGS. 8B and 8C, the maximum path delay at the left side (i.e., the path delay between the master IC 702 and the left-most slave IC 704) is equal to 8, and the maximum path delay at the right side (i.e., the path delay between the master IC 702 and the right-most slave IC 710) is equal to 4. Since these two path delays are not equal, it is requested to apply an additional offset to compensate for their difference. In an embodiment, an offset 2 is added to the compensation times for the right-side slave ICs 708 and 710, in order to achieve the synchronization between the slave ICs at the right side and the slave ICs at the left side.

Figure 9:
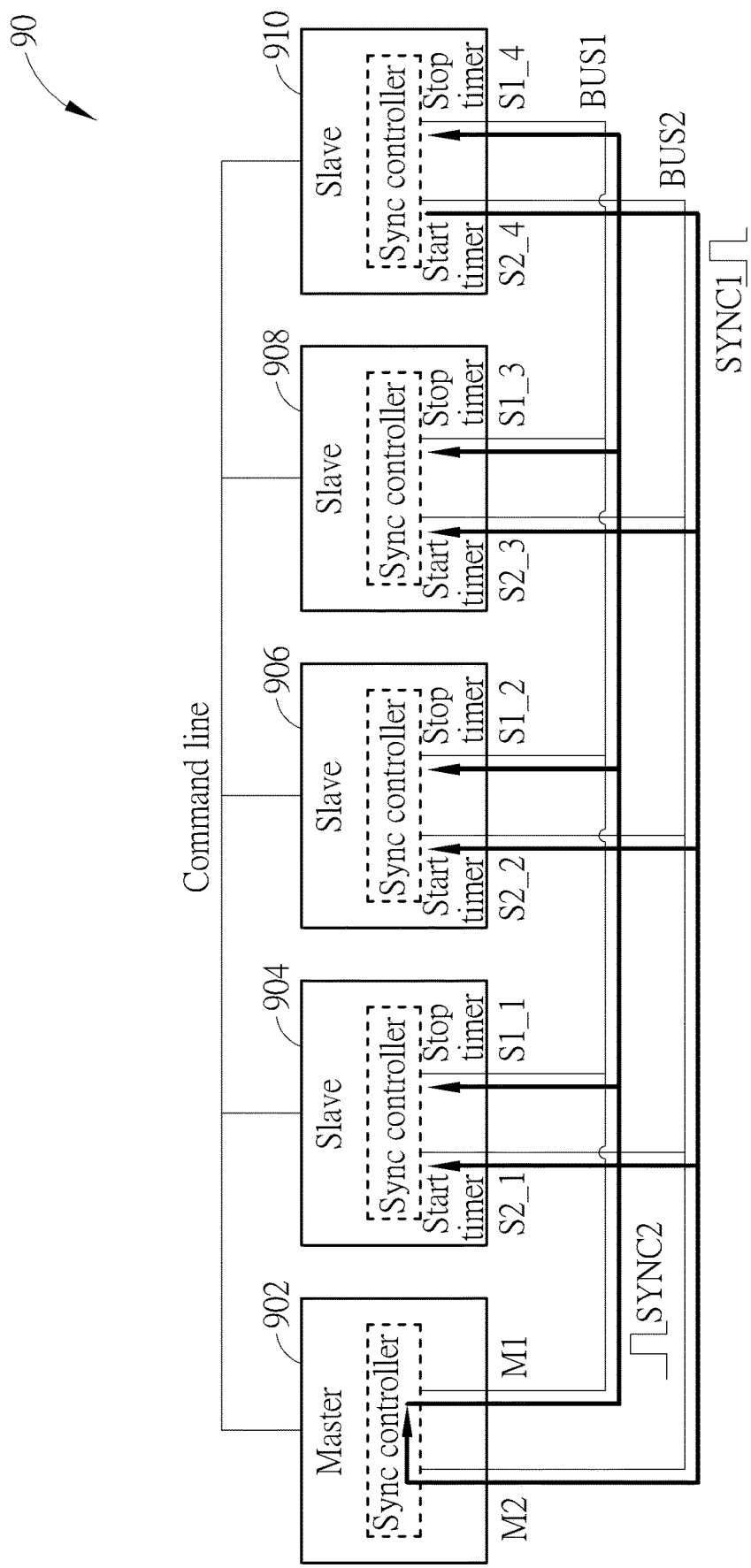
FIG. 9 illustrates an exemplary operation of the calibration mode performed on another driving system.

Note that the driver circuits in the driving system may be deployed in another manner. For example, it is not necessary that the master IC is at the center of the driving system. For example, FIG. 9 illustrates an exemplary operation of the calibration mode performed on another driving system 90, which includes 1 master IC 902 and 4 slave ICs 904, 906, 908 and 910, and these driver circuits are coupled together through transmission buses BUS1 and BUS2. The master IC 902 and the slave ICs 904-910 are coupled to the transmission bus BUS1 through the terminals M1 and S1_1-S1_4, respectively, and coupled to the transmission bus BUS2 through the terminals M2 and S2_1-S2_4, respectively. The implementation of the driving system 90 is similar to the implementation of the driving system 70, except that the master IC 902 is the left-most driver circuit and thus the slave ICs 904-910 are all at the right side of the master IC 902. Similarly, each of the master IC 902 and the slave ICs 904-910 may include a synchronization controller, for performing the calibration and synchronization operations in each driver circuit. The transmission buses BUS1 and BUS2 may be coupled to the synchronization controller inside the master IC 902 and the slave ICs 904-910.

In addition, the transmission of synchronization signals is started from the master IC in the embodiment shown in FIG. 7, but the present invention is not limited thereto. In another embodiment, the transmission of synchronization signals may be started from any of the slave ICs.

FIG. 9 illustrates the operations where the transmission of synchronization signals is started from the slave IC 910. The slave IC 910 may output a first synchronization signal SYNC1 to the transmission bus BUS2, and meanwhile start a timer. At the time when the master IC 902 receives the first synchronization signal SYNC1, this master IC 902 may output a second synchronization signal SYNC2 to the transmission bus BUS1. The second synchronization signal SYNC2 is then received by the slave IC 910, and the slave IC 910 may stop the timer when receiving the second synchronization signal SYNC2. In this manner, the slave IC 910 may obtain the path delay between the slave IC 910 and the master IC 902, so as to calculate the compensation time. The slave IC 910 then stores the compensation time information and/or sends the compensation time information to the master IC 902 to be used for timing synchronization in the subsequent synchronization mode. Similarly, the slave ICs 904, 906 and 908 may also receive the first synchronization signal SYNC1 and the second synchronization signal SYNC2, and record the reception time difference by using a timer, thereby obtaining the corresponding path delay and compensation time.

Therefore, in the implementation as shown in FIG. 9, the compensation time information of all driver circuits may be completely obtained in one calibration operation. In an embodiment, the master IC may collect the compensation time information from each slave IC through the command line.

Figure 10A:
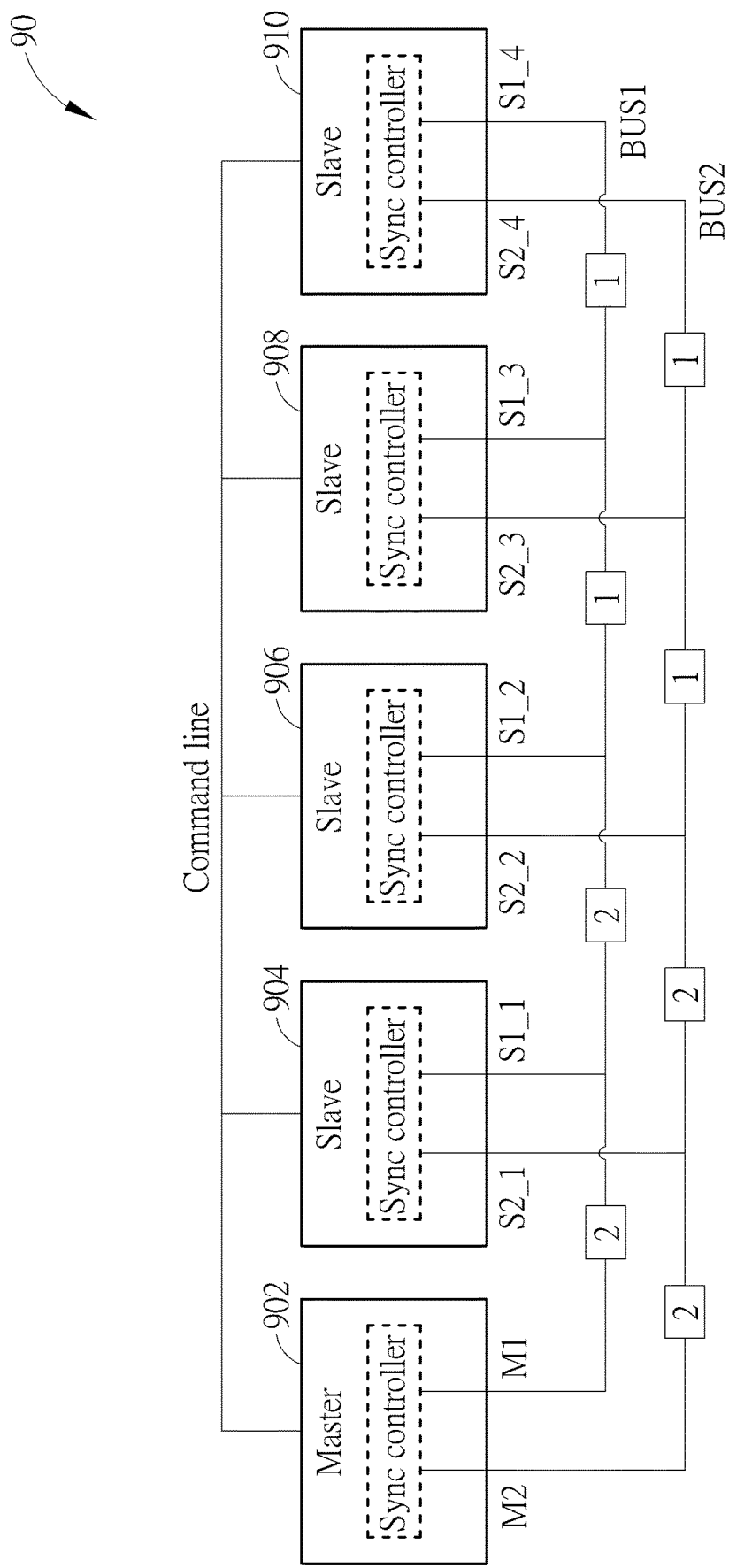
FIG. 10A illustrates the calibration operation for obtaining path delay in the driving system shown in FIG. 9 according to an embodiment of the present invention.

FIG. 10A illustrates the calibration operation for obtaining path delay in the driving system 90 according to an embodiment of the present invention, where the values of delay times are labeled on the corresponding paths of the transmission buses. FIG. 10B is a waveform diagram of the synchronization signals on each terminal under the delay times, to illustrate the operations for calibrating each slave IC. In FIG. 10B, the synchronization signals SYNC1 and SYNC2 are pulse signals, but those skilled in the art would know that the implementation is not limited thereto.

As shown in FIG. 10B, the slave IC 910 first outputs the first synchronization signal SYNC1 through the terminal S2_4 and starts a timer. The first synchronization signal SYNC1 is forwarded through the transmission bus BUS2 and reaches the terminal S2_3 of the slave IC 908 after a delay time 1, then reaches the terminal S2_2 of the slave IC 906 after a delay time 1, then reaches the terminal S2_1 of the slave IC 904 after a delay time 2, and then reaches the terminal M2 of the master IC 902 after a delay time 2. The slave ICs 908, 906 and 904 respectively start a timer to record the reception time of the first synchronization signal SYNC1. The master IC 902 sends back the second synchronization signal SYNC2 through the terminal M1 when receiving the first synchronization signal SYNC1. The second synchronization signal SYNC2 is forwarded through the transmission bus BUS1 and sequentially reaches the slave ICs 904, 906, 908 and 910 after respective delay times. The slave ICs 904, 906, 908 and 910 respectively stop the timer to record the reception time of the second synchronization signal SYNC2.

Therefore, the corresponding path delay may be obtained. In detail, the slave IC 904 will obtain the path delay between the master IC 902 and the slave IC 904, which is equal to 4. The slave IC 906 will obtain the path delay between the master IC 902 and the slave IC 906, which is equal to 8. The slave IC 908 will obtain the path delay between the master IC 902 and the slave IC 908, which is equal to 10. The slave IC 910 will obtain the path delay between the master IC 902 and the slave IC 910, which is equal to 12. Therefore, based on the obtained path delay information, the compensation time between any two driver circuits may be easily obtained.

For example, the master IC 902 may collect the path delay information from each slave IC 904-910, to calculate the compensation time used for the master IC 902 and each slave IC 904-910 accordingly. Alternatively, each slave IC 904-910 may calculate the compensation time according to the path delay, respectively. The detailed calculations are similar to those illustrated in the above paragraphs, and will not be narrated herein.

In order to achieve an accurate calibration result, the status of the I/O pins (i.e., terminals) coupled to the transmission buses BUS1 and BUS2 should be well controlled. On the transmission buses BUS1 and BUS2, each terminal may be switched between an input status and an output status, and the resistive and capacitive (RC) loadings of each transmission bus are evidently influenced by the input/output status of the connected terminals. The RC loadings will further influence the signal propagation speed, which is associated with the measured path delay. As described above, the compensation time is calculated by dividing the path delay by 2, and this calculation is feasible if the paths are symmetric during the transmissions of the first synchronization signal and the second synchronization signal. In other words, the overall I/O status on the transmission bus BUS1 when it propagates the corresponding synchronization signal should be identical to the overall I/O status on the transmission bus BUS2 when it propagates the corresponding synchronization signal.

For example, in the driving system 70 as shown in FIG. 7B, when the master IC 702 transmits the first left synchronization signal SYNC1_L, the terminal M1 of the master IC 702 is set to the output status, and other terminals S1_1-S1_4 coupled to the transmission bus BUS1 are set to the input status. In such a situation, there are 1 output pin and 4 input pins on the transmission bus BUS1 during the transmission of the first left synchronization signal SYNC1_L. When the slave IC 704 transmits the second left synchronization signal SYNC2_L, the terminal S2_1 of the slave IC 704 is set to the output status, and other terminals M2 and S2_2-S2_4 coupled to the transmission bus BUS2 are set to the input status. In such a situation, there are 1 output pin and 4 input pins on the transmission bus BUS2 during the transmission of the second left synchronization signal SYNC2_L. Therefore, the overall input/output status on the transmission bus BUS1 is identical to the overall input/output status on the transmission bus BUS2, thereby achieving the path symmetry; hence, the compensation time may be accurately calculated by dividing the path delay by 2.

Figure 11:
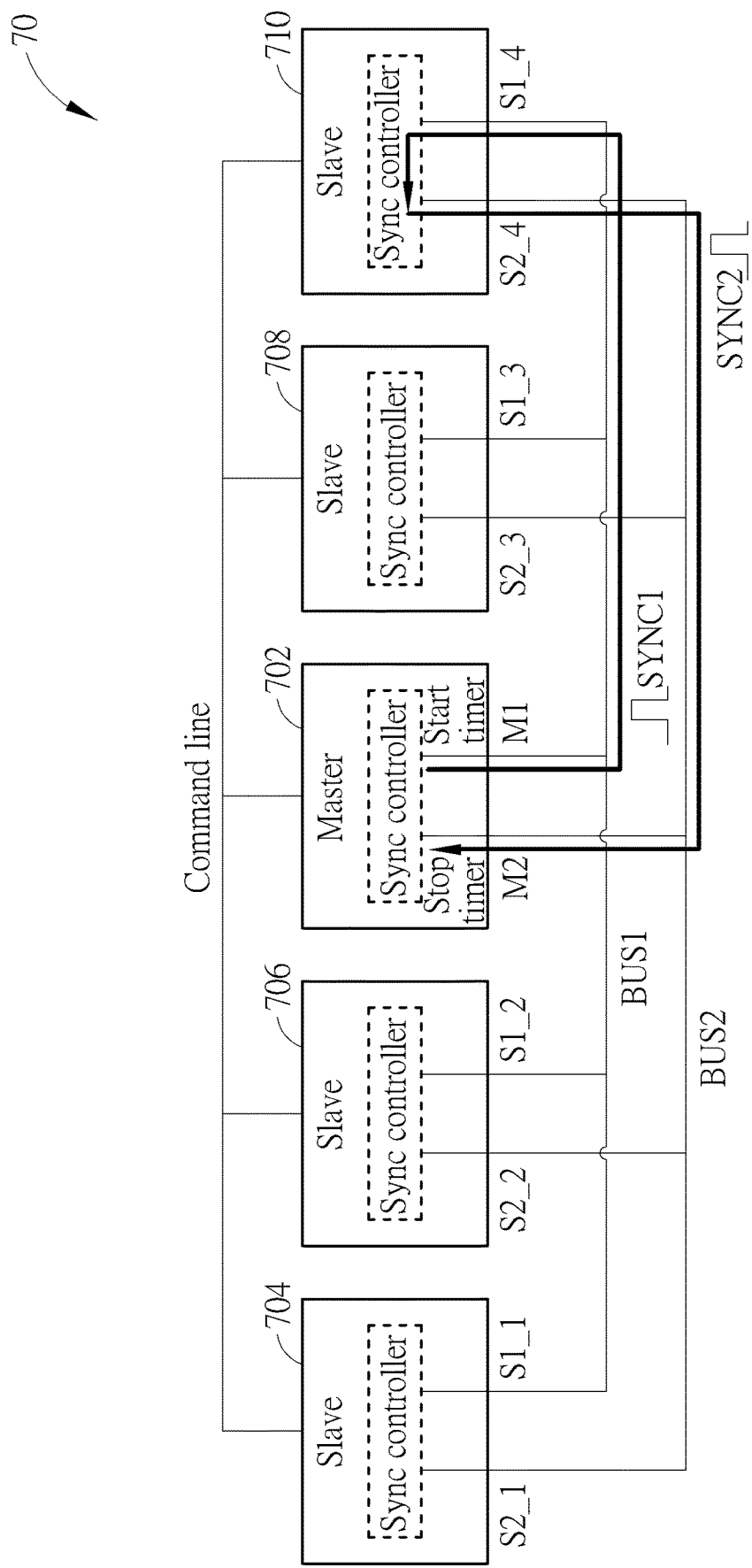
FIG. 11 illustrates another exemplary operation of the calibration mode performed on the driving system.

In the above embodiments, the calibration may be completed by only transmitting a few synchronization signals, and thus the time consumption for the calibration mode may be saved. Note that the calibration method provided in the above descriptions is merely an exemplary implementation of the present invention. In another embodiment, in the calibration mode, a calibration operation may be performed between only two driver circuits. For example, FIG. 11 illustrates another exemplary operation of the calibration mode performed on the driving system 70. As shown in FIG. 11, the master IC 702 may output a first synchronization signal SYNC1 to the transmission bus BUS1 and meanwhile start a timer. The first synchronization signal SYNC1 is forwarded to the slave IC 710, and at this time, the slave 710 sends back a second synchronization signal SYNC2 to the transmission bus BUS2. The second synchronization signal SYNC2 is then forwarded to the master IC 702. When receiving the second synchronization signal SYNC2, the master IC 702 may stop the timer and obtain the path delay between the master IC 702 and the slave IC 710. Subsequently, the master IC 702 may divide the path delay by 2 to obtain the compensation time corresponding to the slave IC 710. The master IC 702 may then repeat the same calibration operation with each of the other slave ICs 704, 706 and 708 to obtain the corresponding path delay and compensation time.

Similarly, during the transmissions of the synchronization signals, the overall input/output status on the transmission bus BUS1 when the first synchronization signal SYNC1 is forwarded should be identical to the overall input/output status on the transmission bus BUS2 when the second synchronization signal SYNC2 is forwarded, in order to achieve the path symmetry. For example, the terminal of the driver circuit outputting the synchronization signal is set to the output status, while the terminals of other driver circuits on the same transmission bus are set to the input status. Therefore, if there are 5 driver circuits coupled to the transmission bus, there will always be 1 output pin and 4 input pins on this transmission bus.

In another embodiment, the synchronization signal may be started from a slave IC instead of the master IC. For example, in the driving system 70, the slave IC 710 may output a first synchronization signal SYNC1 to the transmission bus BUS1 and meanwhile start a timer. When the first synchronization signal SYNC1 is received by the master IC 702, it sends back a second synchronization signal SYNC2 to the transmission bus BUS2. The slave IC 710 then stops the timer when receiving the second synchronization signal SYNC2, to obtain the path delay corresponding to the master IC 702. The slave IC 710 may repeat the same calibration operation with each of the other slave ICs 704, 706 and 708 to obtain the corresponding path delay. In an embodiment, the slave IC 710 may forward the path delay information to the master IC 702, e.g., through the command line, and then the master IC 702 may calculate the compensation time used for the master IC 702 and each slave IC 704-710 accordingly.

The obtained compensation time for each driver circuit may further be applied in the synchronization mode, to synchronize the sensing time for touch sensing between different driver circuits, as described below.

In the synchronization mode, the driver circuits perform touch sensing, which starts from a preset operation which may be controlled by a sensing start signal such as TSHD shown in FIG. 2. Before the synchronization operation, each driver circuit may obtain a corresponding compensation time used for itself, where the compensation time may be calculated from the path delay in the abovementioned calibration mode, and may be delivered to the target driver circuit through the command line.

In the synchronization operation, each slave IC may first generate a notification when receiving the sensing start signal TSHD. The notification may indicate that this slave IC is ready for touch sensing. When the master IC obtains the sensing start signal TSHD and also receives the notification from each slave IC, the master IC may output a confirmation signal through a transmission bus. After outputting the confirmation signal, the master IC may start the preset operation for touch sensing with a delay of the compensation time for the master IC. The confirmation signal may be forwarded to each slave IC through the transmission bus; that is, each slave IC may receive the confirmation signal through the terminal coupled to the transmission bus. After receiving the confirmation signal, the slave IC may start the preset operation for touch sensing with a delay of the compensation time for this slave IC. The preset operation of each driver circuit (including the master IC and each slave IC) may be performed with a specific delay time for each driver circuit. With appropriate delay control, each driver circuit may start the preset operation at the same time, to realize the synchronization of touch sensing operations.

Figure 12:
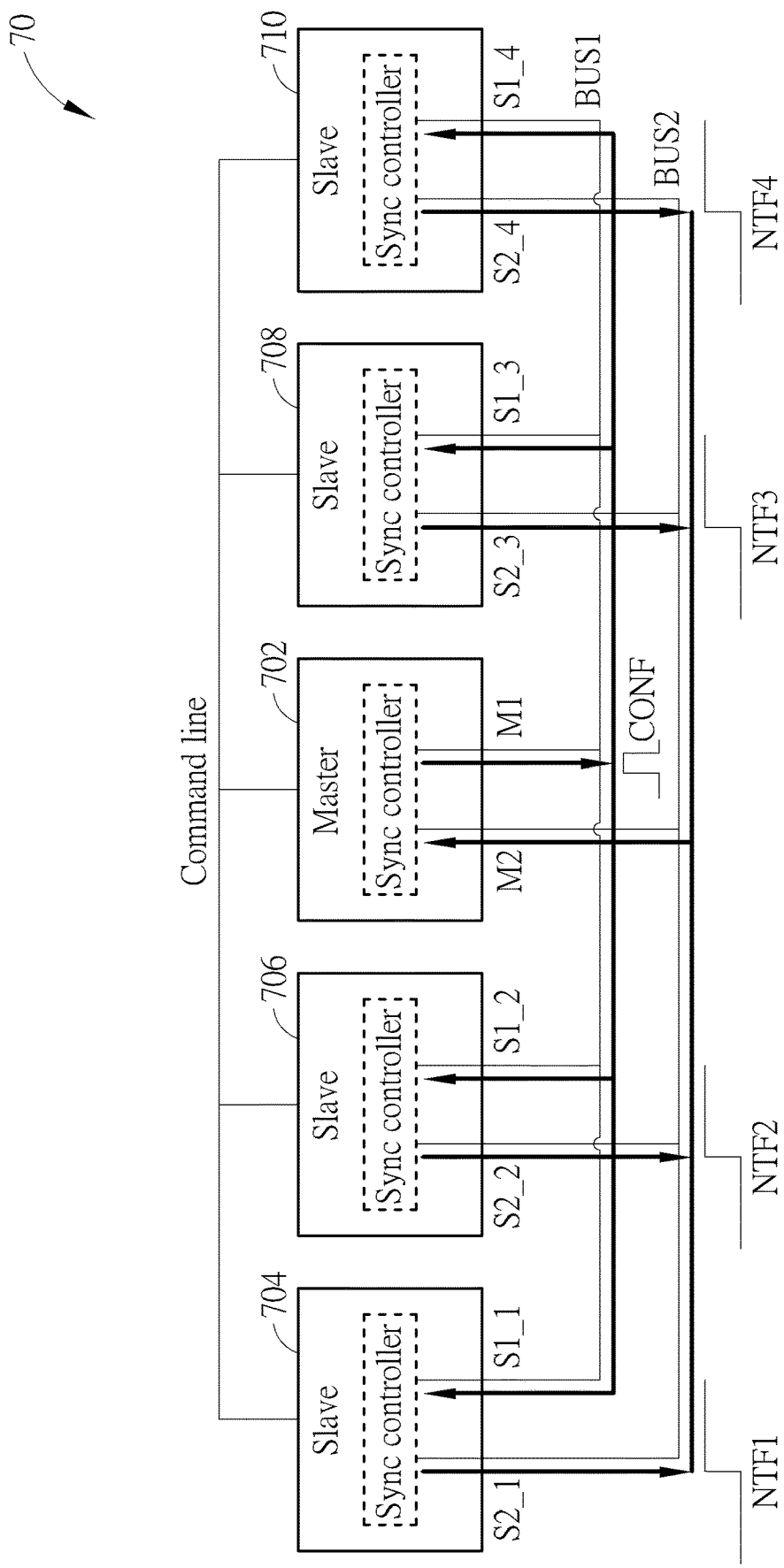
FIG. 12 illustrates an exemplary operation of the synchronization mode performed on the driving system.

To facilitate the illustrations, the same driving systems are utilized to describe the operations of the synchronization mode. FIG. 12 illustrates an exemplary operation of the synchronization mode performed on the driving system 70, where each driver circuit is coupled to other driver circuits through the transmission buses BUS1 and BUS2. First, when the touch panel needs to perform touch sensing, each driver circuit 702-710 may obtain a sensing start signal TSHD. When obtaining the sensing start signal TSHD, each slave IC 704-710 may generate a notification NTF1-NTF4, respectively.

The notifications NTF1-NTF4 may be implemented in any appropriate manner. In this embodiment, the terminals S2_1-S2_4 coupled to the transmission bus BUS2 are in a low level in advance. When obtaining the sensing start signal TSHD, the slave ICs 704-710 may convert the corresponding terminals S2_1-S2_4 from the low level to a high level. More specifically, the slave IC 704 may pull high the terminal S2_1 to generate the notification NTF1 when receiving its sensing start signal TSHD, the slave IC 706 may pull high the terminal S2_2 to generate the notification NTF2 when receiving its sensing start signal TSHD, the slave IC 708 may pull high the terminal S2_3 to generate the notification NTF3 when receiving its sensing start signal TSHD, and the slave IC 710 may pull high the terminal S2_4 to generate the notification NTF4 when receiving its sensing start signal TSHD.

The master IC 702 may receive the notifications NTF1-NTF4 by monitoring the transmission bus BUS2 to determine whether the terminal M2 is pulled to the high level. When the terminals S2_1-S2_4 are all pulled high, which means that the notifications NTF1-NTF4 are all output, the master IC 702 may observe that the terminal M2 is pulled high.

In an embodiment, the terminals S2_1-S2_4 may be implemented with open-drain structure, where the slave ICs 704-710 output the notifications by releasing a pull-low device on the corresponding terminal. Therefore, the levels of the transmission bus BUS2 and the terminal M2 may be pulled high if all of the pull-low devices coupled to the transmission bus BUS2 are released.

When the master IC 702 receives the notifications NTF1-NTF4 and also obtains the sensing start signal TSHD, the master IC 702 may output a confirmation signal CONF through the transmission bus BUS1. After outputting the confirmation signal CONF, the master IC 702 may start the preset operation for touch sensing with a delay of the compensation time for the master IC 702, where the compensation time may be equal to the maximum path delay corresponding to the farthest slave IC.

The confirmation signal CONF is then sequentially received by the slave ICs 704-710. After receiving the confirmation signal, each of the slave ICs 704-710 may start the preset operation for touch sensing with a delay of the compensation time for the respective slave IC. With appropriate compensation times, each of the driver circuits (including the master IC 702 and the slave ICs 704-710) may start the preset operation at the same time, thereby performing touch sensing synchronously.

In an embodiment, in the driving system having one master IC and one or more slave ICs, the touch driving signals may be provided by the master IC, while each driver circuit receives touch sensing signals from the corresponding area of the touch panel. The synchronous touch sensing operations allow each of the driver circuits to receive and process the touch sensing signals with a timing synchronous to the touch driving signals output by the master IC. For example, the demodulation signal for demodulating the touch sensing signal generated in each slave IC may be synchronous to the touch driving signal output by the master IC, and thereby synchronous to the touch sensing signal received by each slave IC.

Figure 13:
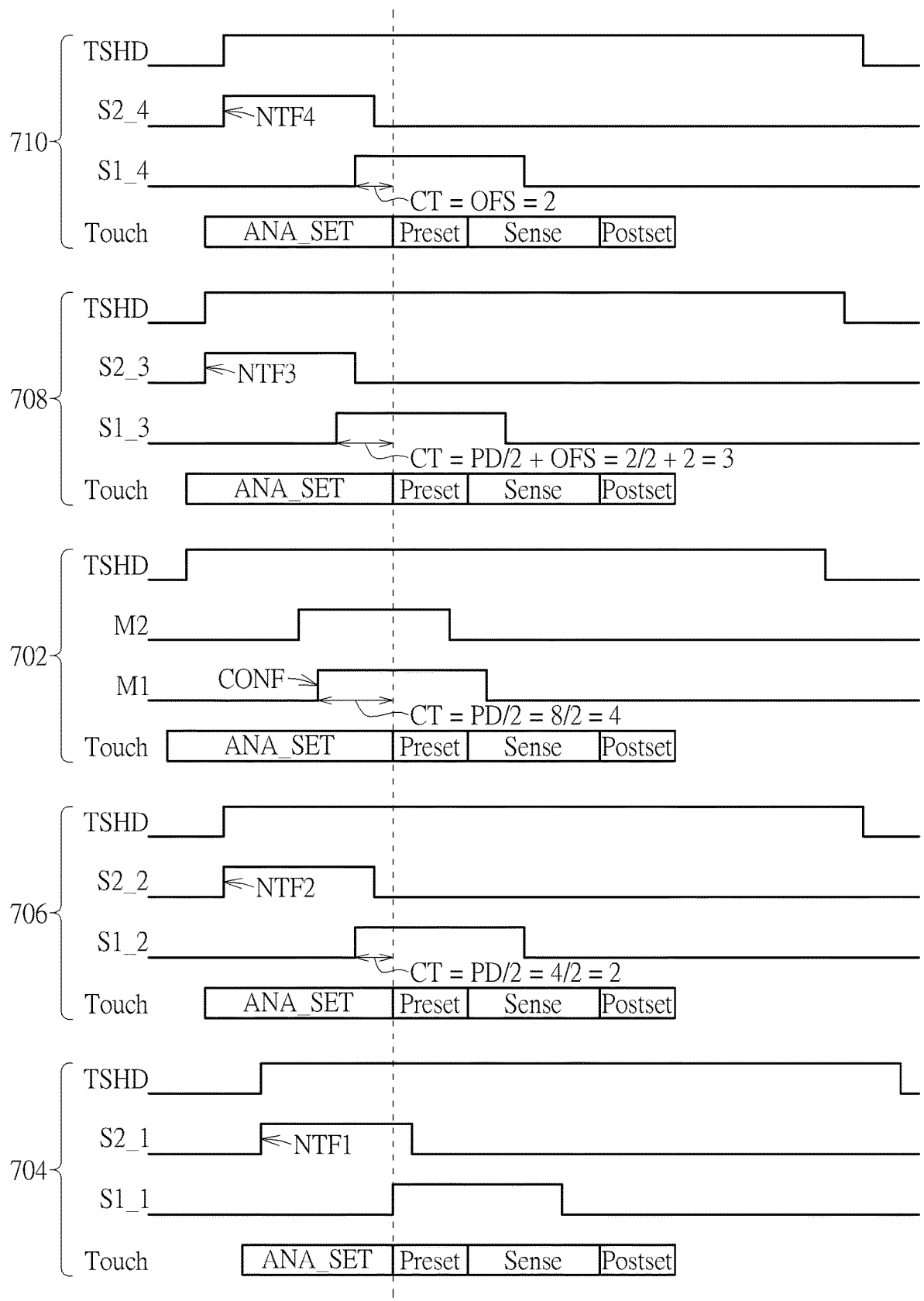
FIG. 13 is a waveform diagram of the touch sensing operations and related notifications and confirmation signal on each terminal of the driving system shown in FIG. 7.

Note that the implementation of delay times shown in FIG. 8A is also applicable to the synchronization mode for performing touch sensing. Refer to FIG. 8A along with FIG. 13, where FIG. 13 is a waveform diagram of the touch sensing operations and related notifications and confirmation signal on each terminal of the driving system 70. As shown in FIG. 13, the touch sensing operation starts with an analog setting (ANA_SET) and a preset operation, where the analog setting is started by receiving an analog sensing start signal TSHD_ANA (which is omitted herein for brevity).

In this embodiment, the transmission bus BUS2 is applied to forward the notifications NTF1-NTF4, where a low-to-high transition represents the output of the corresponding notification. As shown in FIG. 13, each slave IC 704-710 pulls high the corresponding terminal S2_1-S2_4 coupled to the transmission bus BUS2 to output the corresponding notification NTF1-NTF4 when obtaining the sensing start signal TSHD. The terminal M2 of the master IC 702 is pulled high after all the other terminals coupled to the transmission bus BUS2 become high, which means that all the slave ICs are ready for touch sensing.

Subsequently, the master IC 702 outputs the confirmation signal CONF to the transmission bus BUS1 through the terminal M1, where the confirmation signal CONF is represented by a pulse (or the rising edge of a pulse). The master IC 702 then starts the preset operation after delaying by a compensation time, which may be calculated from the maximum path delay associated with the master IC 702 obtained in the calibration mode.

In this embodiment, after the left-side calibration operation, the master IC 702 (and/or the slave ICs 704-706) may obtain that the path delay between 702 and 704 equals 8 and the path delay between 704 and 706 equals 4. After the right-side calibration operation, the master IC 702 (and/or the slave ICs 708-710) may obtain that the path delay between 702 and 710 equals 4 and the path delay between 710 and 708 equals 2. The maximum path delay (denoted by PD) associated with the master IC 702 is 8; hence, the compensation time (denoted by CT) for the master IC 702 is calculated as 8/2=4, as shown in FIG. 13.

In addition, since the path delays for the left-side slave ICs 704 and 706 are greater than the path delays for the right-side slave ICs 708 and 710, an offset (denoted by OFS) is added to the compensation time for the right-side slave ICs 708 and 710. In this embodiment, the offset is equal to the difference of the path delay between 702 and 704 and the path delay between 702 and 710 divided by 2, i.e., (8−4)/2=2.

The confirmation signal CONF output by the master IC 702 may be sequentially received by the slave ICs 704-710. When the slave IC 708 receives the confirmation signal CONF, it may delay by a compensation time with an offset and then start the preset operation. The actual compensation time for the slave IC 708 is 3, which is equal to the path delay divided by 2 plus the offset. When the slave IC 710 receives the confirmation signal CONF, it may delay by a compensation time which is equal to the offset, i.e., 2, associated with the left-side and right-side delay difference, and then start the preset operation. When the slave IC 706 receives the confirmation signal CONF, it may delay by a compensation time and then start the preset operation, and the compensation time for the slave IC 706 is equal to the path delay divided by 2, i.e., 4/2=2. When the slave IC 704 receives the confirmation signal CONF, it may immediately start the preset operation without any delay, since the slave IC 704 has the maximum path delay corresponding to the master IC 702 and is the last one receiving the confirmation signal CONF.

As shown in FIG. 13, with appropriate delay control, the master IC 702 and the slave ICs 704-710 may start the preset operation for touch sensing at the same time, so as to perform touch sensing synchronously.

Figure 14:
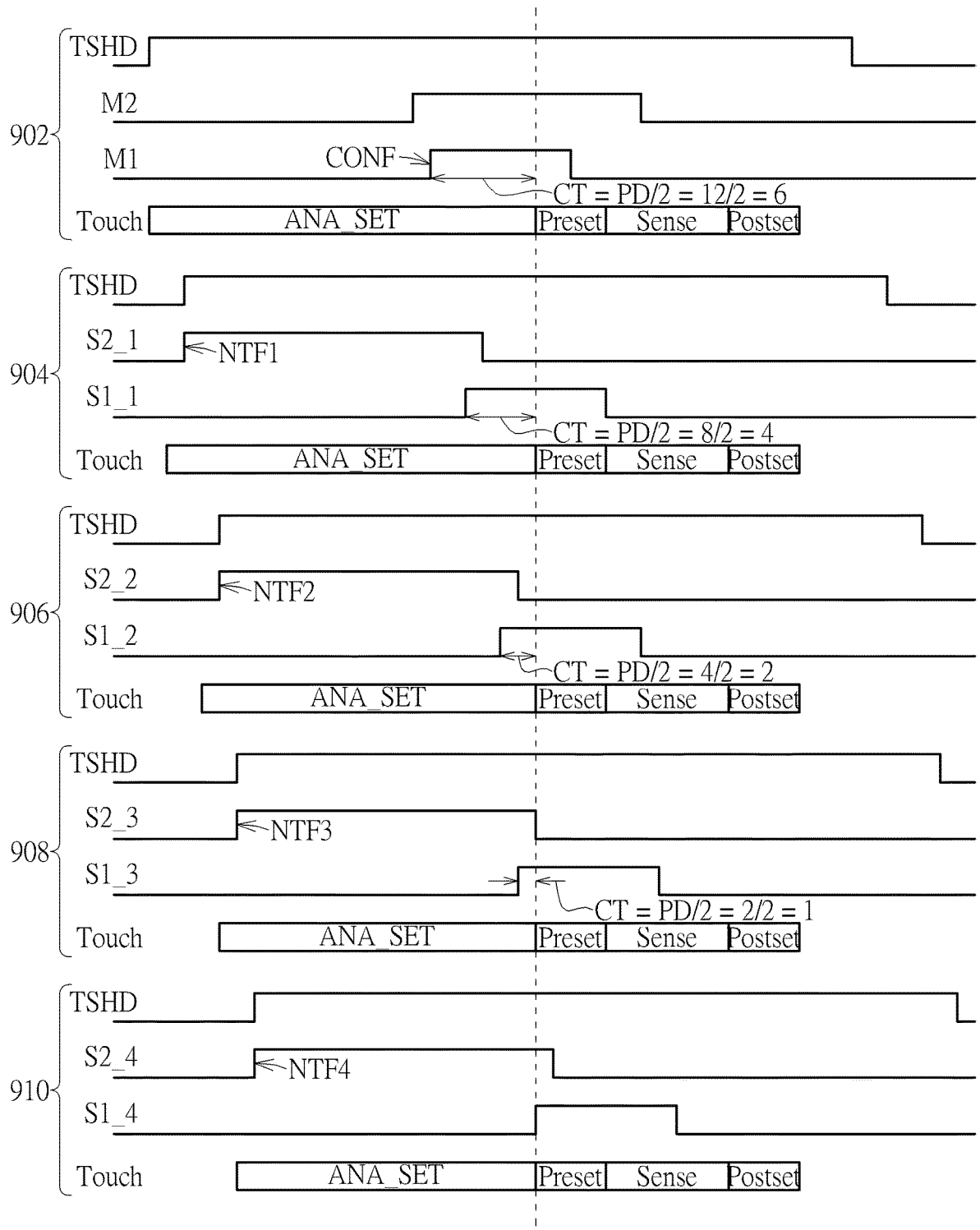
FIG. 14 is a waveform diagram of the touch sensing operations and related notifications and confirmation signal on each terminal of the driving system shown in FIG. 9.

In another embodiment, the implementation of delay times shown in FIG. 10A is also applicable to the synchronization mode for performing touch sensing. Refer to FIG. 10A along with FIG. 14, where FIG. 14 is a waveform diagram of the touch sensing operations and related notifications and confirmation signal on each terminal of the driving system 90. Similarly, as shown in FIG. 14, the touch sensing operation starts with an analog setting (ANA_SET) and a preset operation, where the analog setting is started by receiving an analog sensing start signal TSHD_ANA (which is omitted herein for brevity).

In this embodiment, the transmission bus BUS2 is applied to forward the notifications NTF1-NTF4, where a low-to-high transition represents the output of the corresponding notification. As shown in FIG. 14, each slave IC 904-910 pulls high the corresponding terminal S2_1-S2_4 coupled to the transmission bus BUS2 to output the corresponding notification NTF1-NTF4 when obtaining the sensing start signal TSHD. The terminal M2 of the master IC 902 is pulled high after all the other terminals coupled to the transmission bus BUS2 become high, which means that all the slave ICs are ready for touch sensing.

Subsequently, the master IC 902 outputs the confirmation signal CONF to the transmission bus BUS1 through the terminal M1, where the confirmation signal CONF is represented by a pulse (or the rising edge of a pulse). The master IC 902 then starts the preset operation after delaying by a compensation time, which may be calculated from the maximum path delay associated with the master IC 902 obtained in the calibration mode.

In this embodiment, after the calibration operation, the master IC 902 (and/or the slave ICs 904-910) may obtain that the path delay between 902 and 910 equals 12, the path delay between 904 and 910 equals 8, the path delay between 906 and 910 equals 4, and the path delay between 908 and 910 equals 2. The maximum path delay associated with the master IC 902 is 12; hence, the compensation time for the master IC 902 is calculated as 12/2=6, as shown in FIG. 14.

Note that only a one-side calibration operation is performed in the calibration mode; hence, no offset is required in the calculation of the compensation time in this embodiment.

The confirmation signal CONF output by the master IC 902 may be sequentially received by the slave ICs 904-910. When the slave IC 904 receives the confirmation signal CONF, it may delay by a compensation time and then start the preset operation, and the compensation time for the slave IC 904 is equal to the path delay divided by 2, i.e., 8/2=4. When the slave IC 906 receives the confirmation signal CONF, it may delay by a compensation time and then start the preset operation, and the compensation time for the slave IC 906 is equal to the path delay divided by 2, i.e., 4/2=2. When the slave IC 908 receives the confirmation signal CONF, it may delay by a compensation time and then start the preset operation, and the compensation time for the slave IC 908 is equal to the path delay divided by 2, i.e., 2/2=1. When the slave IC 910 receives the confirmation signal CONF, it may immediately start the preset operation without any delay, since the slave IC 910 has the maximum path delay corresponding to the master IC 902 and is the last one receiving the confirmation signal CONF.

As shown in FIG. 14, with appropriate delay control, the master IC 902 and the slave ICs 904-910 may start the preset operation for touch sensing at the same time, so as to perform touch sensing synchronously.

In the above embodiments, the slave ICs send the notifications through a transmission bus, but the implementation of notifications is not limited thereto. In another embodiment, the slave ICs may send the notification through the command line coupled between the master IC and the slave ICs.

Figure 15:
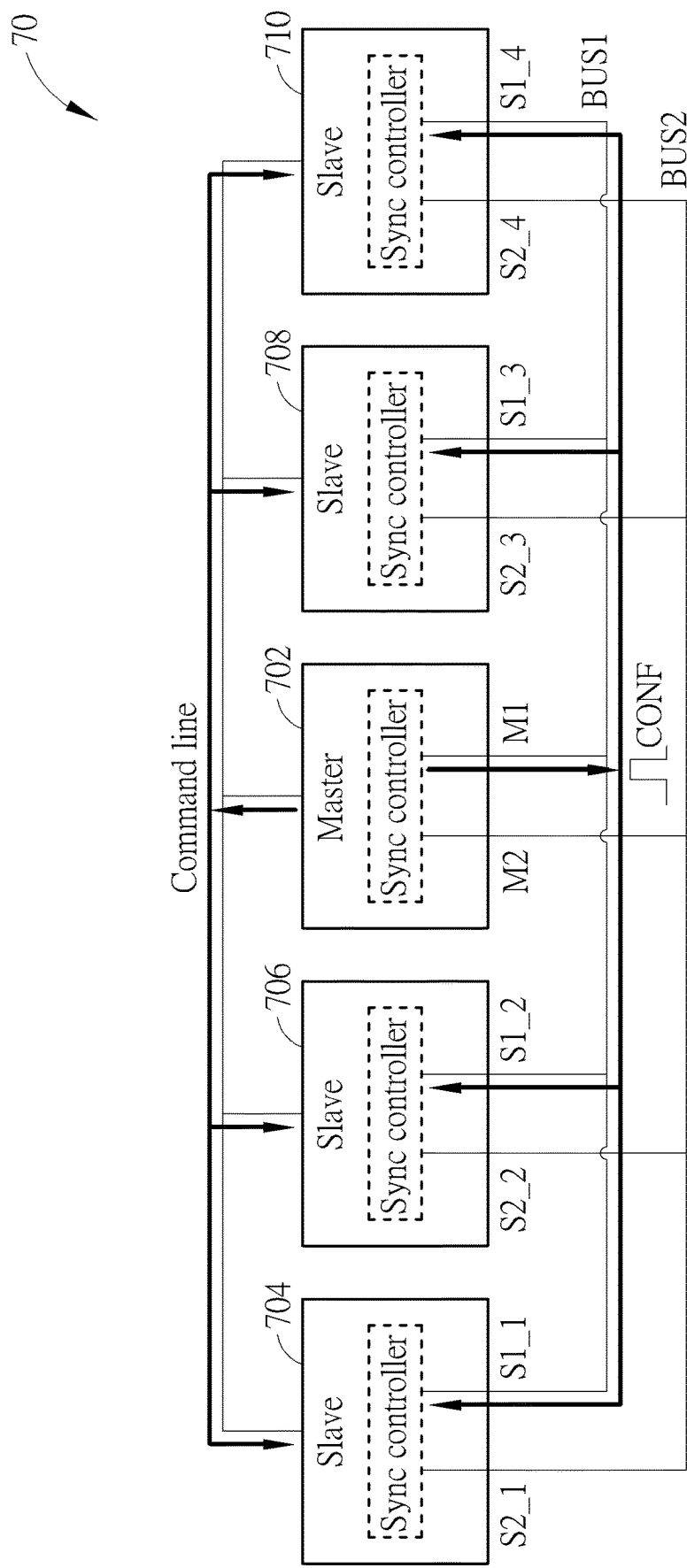
FIG. 15 illustrates another exemplary operation of the synchronization mode performed on the driving system.

FIG. 15 illustrates another exemplary operation of the synchronization mode performed on the driving system 70, where each driver circuit is coupled to other driver circuits through the transmission buses BUS1 and BUS2 and a command line. In this embodiment, the slave ICs 704-710 send the notifications to the master IC 702 through the command line.

First, the master IC 702 receives the notification from each slave IC 704-710 through the command line. For example, the master IC 702 may read the status of each slave IC 704-710 through the command line, to ensure that each slave IC 704-710 is ready for touch sensing. As shown in FIG. 15, the arrows on the command line indicate that the master IC 702 reads the status of each slave IC 704-710, where the status represents the notification. Alternatively, the slave ICs 704-710 may send a signal carrying the notification to the master IC 702 through the command line. When the master IC 702 obtains that all the slave ICs 704-710 are ready and also obtains the sensing start signal TSHD, the master IC 702 may output the confirmation signal CONF through the transmission bus BUS1, and then start the preset operation after delaying by a compensation time. The confirmation signal CONF is forwarded through the transmission bus BUS1 and sequentially received by the slave ICs 704-710. After receiving the confirmation signal CONF, each slave IC 704-710 starts the preset operation as delaying by a respective compensation time. With appropriate delay control, the master IC 702 and the slave ICs 704-710 may start the preset operation at the same time, and thereby perform touch sensing synchronously.

As mentioned above, the touch sensing operations may be initialized by using the analog sensing start signal TSHD_ANA and the digital sensing start signal TSHD. In order to simplify the touch sensing process, one or both of the sensing start signals TSHD_ANA and TSHD may be omitted. For example, in an embodiment, the confirmation signal provided by the master IC may serve to indicate the start of the preset operation, to replace the function of the sensing start signal TSHD.

Figure 16A:
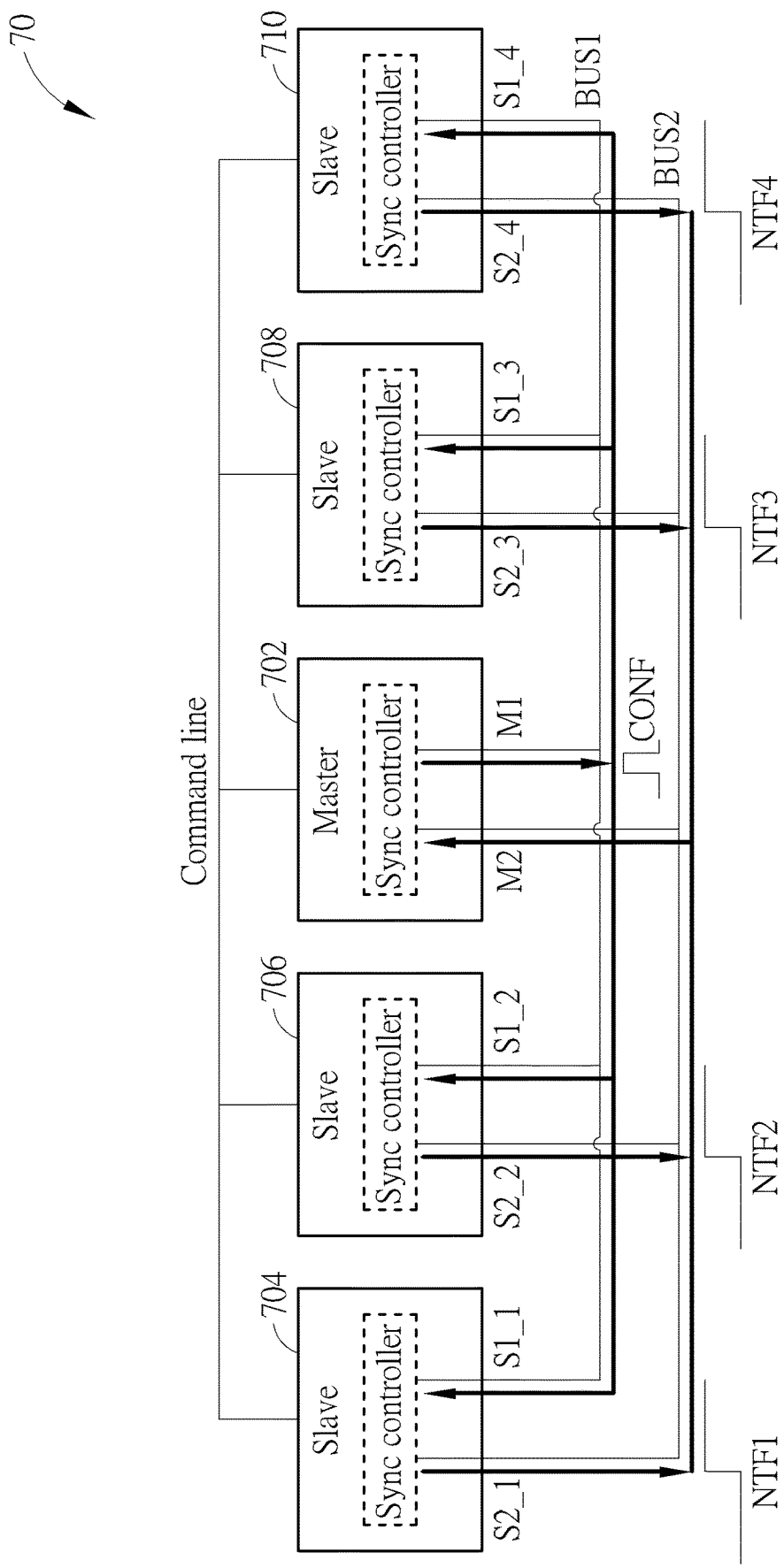
FIG. 16A illustrates a further exemplary operation of the synchronization mode performed on the driving system.

FIG. 16A illustrates a further exemplary operation of the synchronization mode performed on the driving system 70, where the sensing start signal TSHD is omitted. When a touch panel cooperatively controlled by the master IC 702 and the slave ICs 704-710 needs to perform touch sensing, each slave IC 704-710 may output the corresponding notification NTF1-NTF4 to the master IC 702, and the master IC 702 may correspondingly output a confirmation signal CONF to the transmission bus BUS1 through the terminal M1. The notifications NTF1-NTF4 may be forwarded through the transmission bus BUS2 as shown in FIG. 16A, or may be delivered using the command line as shown in FIG. 15. The master IC 702 then starts the preset operation after delaying by a compensation time. The confirmation signal CONF is forwarded through the transmission bus BUS1 and sequentially received by the slave ICs 704-710. After receiving the confirmation signal CONF, each slave IC 704-710 starts the preset operation as delaying by a respective compensation time. With appropriate delay control, the master IC 702 and the slave ICs 704-710 may start the preset operation at the same time, and thereby perform touch sensing synchronously.

Figure 16B:
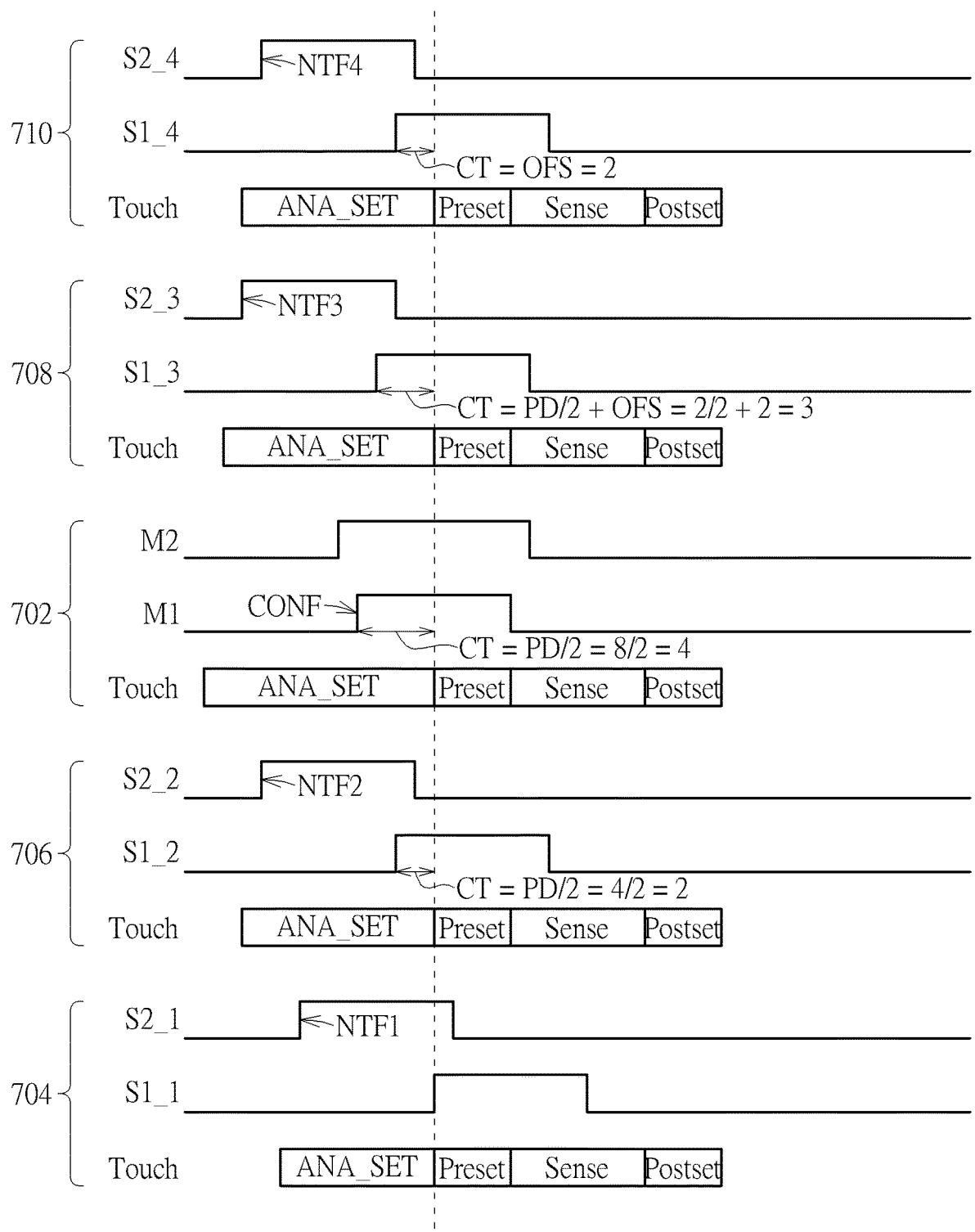
FIG. 16B and FIG. 16C are waveform diagrams of the touch sensing operations and related notifications and confirmation signal on each terminal of the driving system.

The related waveforms are shown in FIG. 16B, which illustrates the touch sensing operations and related confirmation signal output or received on each terminal of the driving system 70. Similarly, the touch sensing operation starts with an analog setting (ANA_SET) and a preset operation. In this embodiment, the analog setting is started by receiving an analog sensing start signal TSHD_ANA (which is omitted herein for brevity). The preset operation is started after the conformation signal CONF is obtained with appropriate delay time, and the sensing start signal TSHD is not generated.

As shown in FIG. 16B, each of the slave ICs 704-710 may generate the corresponding notification NTF1-NTF4 when it is ready for touch sensing. The notifications NTF1-NTF4 may be received by the master IC 702 through the transmission bus BUS2 or the command line, as those described in the above embodiments. The following operations and related compensation times are identical to those shown in FIG. 13, and will not be narrated herein.

Figure 16C:
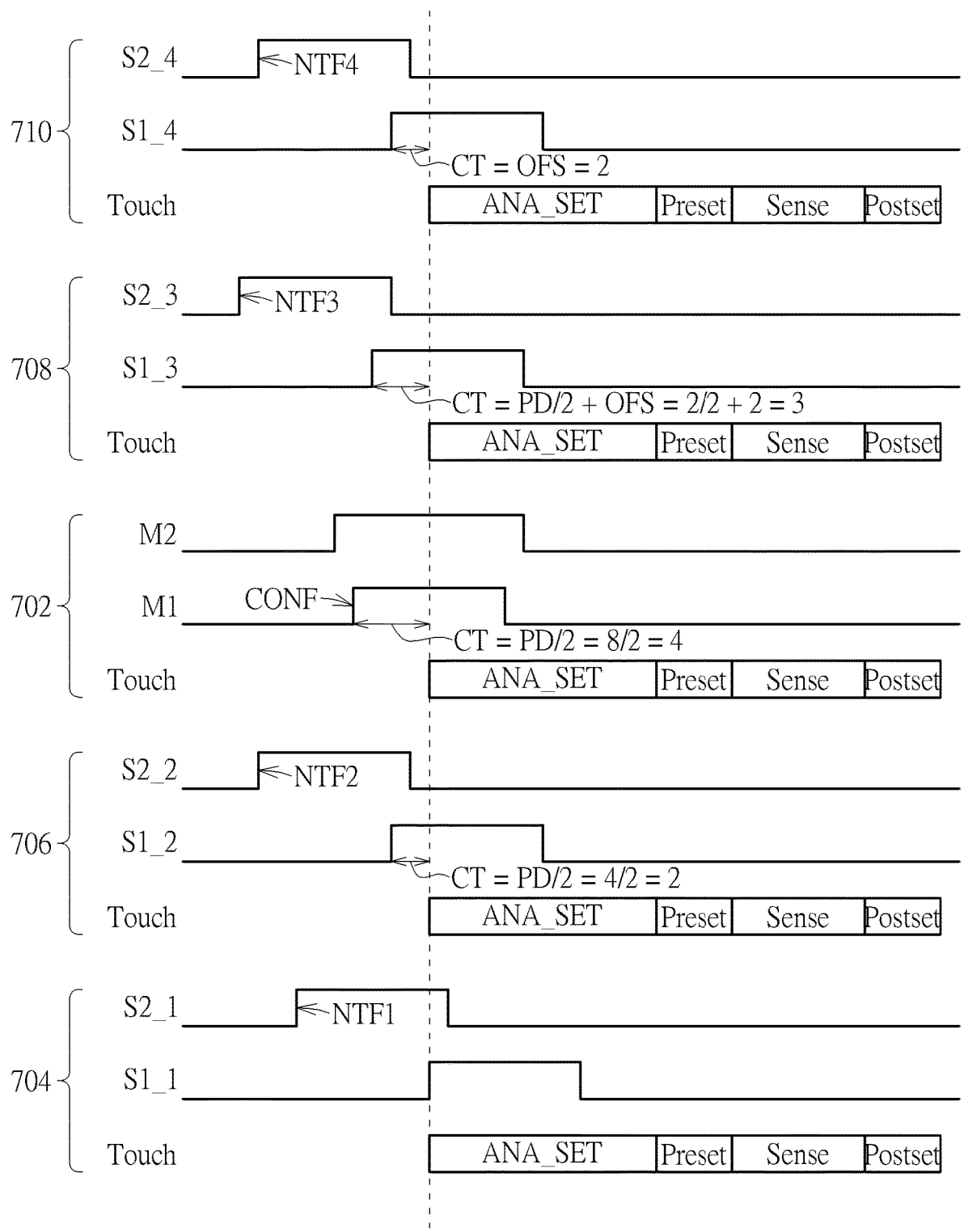

FIG. 16C is a waveform diagram of the touch sensing operations and related notifications and confirmation signal on each terminal of the driving system 70, where both the analog sensing start signal TSHD_ANA and the sensing start signal TSHD are omitted. In such a situation, the analog setting (ANA_SET) is started after the conformation signal CONF is obtained with appropriate delay. The delayed compensation times are identical to those shown in FIG. 13, and will not be repeated herein. With appropriate delay control, the master IC 702 and the slave ICs 704-710 may start the analog setting at the same time; hence, the preset operation following the analog setting may also be performed at the same time, so as to perform touch sensing synchronously.

Note that the present invention aims at proposing a method of synchronizing the touch sensing operations performed in a driving system having multiple driver circuits for cooperatively controlling a touch panel. The method includes a calibration mode and a synchronization mode. In the calibration mode, the path delay between the driver circuits may be measured, in order to calculate a compensation time for each driver circuit. The calibration mode may be performed at any time before the touch sensing operation. In an embodiment, the calibration mode may be performed periodically, and/or performed in an idle time of the driving system.

The compensation time obtained in the calibration mode may be applied in the synchronization mode, to perform synchronization of touch sensing. The synchronization mode may be performed during the touch sensing operation.

Also note that the above descriptions specify several calibration operations and synchronization operations performed in a driving system having 5 driver circuits, but the present invention is not limited thereto. For example, in another embodiment, the operations of the calibration mode and synchronization mode may be performed in another driving system having different numbers of driver circuits such as 3, 4, 6 or 7. These driver circuits may be commonly coupled through two transmission buses, in order to perform synchronization and control a touch panel cooperatively. Among the driver circuits, the master IC may be deployed or configured at any position.

To sum up, the present invention provides a driving system having multiple driver circuits which cooperatively control the touch sensing operations of a touch panel. One of the driver circuits is configured as a master IC and other driver circuits are configured as slave ICs. In the driving system, each driver circuit has two terminals, one of which is commonly coupled to a transmission bus, and the other is commonly coupled to another transmission bus. Therefore, two terminals in each driver circuit may complete the calibration and synchronization operations for touch sensing. In addition, the driving system may include any number of driver circuits without an upper limitation, and the master IC may be deployed at any position.

The driver circuits are operated in a calibration mode and a synchronization mode. In the calibration mode, the synchronization signals are delivered through the transmission buses to obtain the path delay between any two driver circuits. In an embodiment, all driver circuits located at the right side or all driver circuits located at the left side of a specific driver circuit may be calibrated by using the transmissions of one forward synchronization signal and one backward synchronization signal. The input/output status on these two transmission buses are identical during the transmissions of synchronization signals to achieve the path symmetry.

In the synchronization mode, the slave ICs provide notifications indicating that they are ready for touch sensing. The master IC may monitor a transmission bus to receive the notifications, or the notifications may be transmitted through a command line. After receiving the notifications, the master IC outputs a confirmation signal through a transmission bus and then starts the preset operation for touch sensing after a delay of a compensation time. The slave ICs receive the confirmation signal through the transmission bus and then start the preset operation for touch sensing after a delay of a respective compensation time. The compensation time for each driver circuit is calculated from the path delay which is obtained in the calibration mode. With appropriate delay control, each driver circuit may start the preset operation at the same time, and thereby perform touch sensing synchronously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving system comprising:
   a plurality of driver circuits, each having a first terminal and a second terminal, the first terminal of each of the plurality of driver circuits being commonly coupled to a first transmission bus, and the second terminal of each of the plurality of driver circuits being commonly coupled to a second transmission bus, the plurality of driver circuits comprising:
   a first driver circuit to output a first synchronization signal to the first transmission bus through the first terminal; and
   a second driver circuit to output a second synchronization signal to the second transmission bus through the second terminal at the time when receiving the first synchronization signal from the first transmission bus;
   wherein a compensation time corresponding to the second driver circuit is calculated according to an output time point of the first synchronization signal and a reception time point of the second synchronization signal.

2. The driving system of claim 1, wherein the plurality of driver circuits comprise more than 3 driver circuits.

3. The driving system of claim 1, wherein a third driver circuit among the plurality of driver circuits receive the first synchronization signal from the first transmission bus through the first terminal and receive the second synchronization signal from the second transmission bus through the second terminal.

4. The driving system of claim 3, wherein a compensation time corresponding to the third driver circuit is calculated according to a reception time point of the first synchronization signal and a reception time point of the second synchronization signal.

5. The driving system of claim 1, wherein the first driver circuit is a master driver circuit, which obtains a plurality of compensation times by outputting the first synchronization signal, wherein each of the plurality of compensation times corresponds to one of the plurality of driver circuits.

6. The driving system of claim 1, wherein the first driver circuit is a slave driver circuit, which sends the compensation time corresponding to the second driver circuit to a master driver circuit among the plurality of driver circuits.

7. The driving system of claim 1, wherein the first driver circuit is a master driver circuit, and the plurality of driver circuits further comprise at least one first slave driver circuit located at a first side of the master driver circuit and at least one second slave driver circuit located at a second side of the master driver circuit, wherein the master driver circuit outputs the first synchronization signal received by the at least one first slave driver circuit and outputs a third synchronization signal received by the at least one second slave driver circuit.

8. The driving system of claim 1, wherein the first terminal of the first driver circuit is set to an output status and the first terminal of the plurality of driver circuits except for the first driver circuit is set to an input status when the first synchronization signal is transmitted, and the second terminal of the second driver circuit is set to the output status and the second terminal of the plurality of driver circuits except for the second driver circuit is set to the input status when the second synchronization signal is transmitted.

9. The driving system of claim 1, wherein the plurality of driver circuits synchronize a sensing time for touch sensing by using the compensation time.

* * * * *